(12) United States Patent
Koga et al.

(10) Patent No.: US 7,907,509 B2
(45) Date of Patent: Mar. 15, 2011

(54) COMMUNICATION APPARATUS, INTEGRATED CIRCUIT AND COMMUNICATION METHOD

(75) Inventors: Hisao Koga, Fukuoka (JP); Nobutaka Kodama, Fukuoka (JP); Taisuke Konishi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 985 days.

(21) Appl. No.: 11/573,168

(22) PCT Filed: May 26, 2006

(86) PCT No.: PCT/JP2006/311035
§ 371 (c)(1),
(2), (4) Date: Feb. 2, 2007

(87) PCT Pub. No.: WO2006/126738
PCT Pub. Date: Nov. 30, 2006

(65) Prior Publication Data
US 2009/0017757 A1    Jan. 15, 2009

(30) Foreign Application Priority Data
May 26, 2005   (JP) ................................. 2005-153490

(51) Int. Cl.
*H04J 11/00*    (2006.01)
*H04L 12/26*    (2006.01)
*H04L 27/28*    (2006.01)

(52) U.S. Cl. .................. 370/208; 370/252; 375/260
(58) Field of Classification Search .................. None
See application file for complete search history.

(56) References Cited

U.S. PATENT DOCUMENTS

| | | | |
|---|---|---|---|
| 6,507,622 B2 | 1/2003 | Maki et al. | |
| 6,680,979 B2 * | 1/2004 | Kato et al. | 370/437 |
| 6,907,044 B1 | 6/2005 | Yonge, III et al. | |
| 6,934,340 B1 * | 8/2005 | Dollard | 455/450 |
| 7,068,592 B1 * | 6/2006 | Duvaut et al. | 370/203 |
| 7,133,419 B1 * | 11/2006 | Hendrichs et al. | 370/468 |
| 2003/0096579 A1 * | 5/2003 | Ito et al. | 455/67.1 |
| 2005/0037722 A1 | 2/2005 | Koga et al. | |
| 2006/0109925 A1 * | 5/2006 | Kannan et al. | 375/260 |

FOREIGN PATENT DOCUMENTS

| | | |
|---|---|---|
| JP | 11-163807 | 6/1999 |
| WO | 9810545 | 3/1998 |

OTHER PUBLICATIONS

PCT International Search Report dated Sep. 7, 2006.

* cited by examiner

Primary Examiner — Steven H Nguyen
(74) Attorney, Agent, or Firm — Dickinson Wright PLLC

(57) ABSTRACT

A diversity circuit uses a plurality of sub-carriers showing CINRs below a lowest threshold, so as to form a sub-carrier group so that combined CINR of the sub-carriers is above the lowest threshold. A diversity tone map generator generates a tope map associated with the lowest primary modulation scheme, based on output from the diversity circuit. A tone map generator generates a tone map associated with primary modulation schemes applied to respective sub-carriers, based on output from the diversity tone map generator.

11 Claims, 21 Drawing Sheets

| SUB-CARRIER NUMBER | CINR VALUE |
|---|---|
| 55 | 8dB |
| 56 | 9.5dB |
| 57 | 6dB |
| 58 | 3dB |

| TOTAL | 13.3dB |

DIVERSITY TONE MAP APPLIED

COMMUNICATION APPARATUS, INTEGRATED CIRCUIT AND COMMUNICATION METHOD

TECHNICAL FIELD

The present invention relates to a communication apparatus that performs multi-carrier communication while performing channel estimation, particularly to a communication apparatus, an integrated circuit, and a communication method that use a wired transmission line for multi-carrier communication.

BACKGROUND ART

Multi-carrier modulation/demodulation technology often used in multi-carrier transmission systems includes FFT (Fast Fourier Transform)-based OFDM (Orthogonal Frequency Division Multiplexing) and wavelet-based OFDM. Wired transmission lines include a power line, a telephone line, and the like. Power line communication is an example of multi-carrier communication technology applied to wired communication, as disclosed in U.S. Pat. No. 6,507,622B2 (Japanese Patent Laid-open Publication H11-163807), for instance. The FFT-based OFDM enables multi-carrier communication using FFT, thus widely used in both wired and wireless communications, including wireless LAN and power line communication, for example. Compared with the FFT-based OFDM, the wavelet-based OFDM has resistance to inter-carrier interference and superiority in properties.

Further, the FFT-based OFDM requires GI (guard interval) to prevent loss of orthogonality among sub-carriers, while the wavelet-based OFDM requires no GI, thus capable of improving transmission efficiency. FFT-based OFDM processing is not described here since it is widely known. There are two types of wavelets used in the wavelet-based OFDM: a complex-value type and a real-value type. A representative example of the former type is filtered OFDM and the like; the latter type is CMFB (Cosine Modulated Filter Bank) and the like. The wavelet used in the wavelet-based OFDM in the description below is the real-value type. The wavelet-based OFDM is a transmission system based on digital modulation/demodulation processing using a real coefficient wavelet filter bank. The transmission system is one type of a multi-carrier system, in which the real coefficient filter bank combines a plurality of digital-modulated waves and generates a transmitted signal. PAM (Pulse Amplitude Modulation) is used as a modulation scheme for each carrier. Explained below is data transmission in a digital wavelet modulation transmission system (hereinafter referred to as a DWMC transmission system) described above. FIG. 22 shows an example of wavelet waveforms. As shown in FIG. 22, impulse responses of respective sub-carriers in the wavelet waveforms overlap within the respective sub-carriers when transmitted in the digital wavelet modulation transmission system.

FIG. 23 shows an example of a transmitted waveform on a multi-carrier communication apparatus using the wavelet-based OFDM. As shown in FIG. 23, respective transmission symbols form a time waveform, which is a combination of the impulse responses of the respective sub-carriers.

FIG. 24 shows an example of a transmitted spectrum on the multi-carrier communication apparatus using the wavelet-based OFDM. In the DWMC transmission system, several tens to several hundreds of transmission symbols as shown in FIG. 23 form one transmission frame. FIG. 25 shows an example of a configuration within a transmitted frame on the multi-carrier communication apparatus using the wavelet-based OFDM. The transmitted frame includes symbols for information data transmission and preamble symbols used for carrier detection, synchronization, equalization, and the like.

To describe features of the wired transmission lines, a power line in power line communication is explained below as an example. FIG. 26 shows attenuation characteristics of the power line. FIG. 27 shows group delay characteristics of the power line. As shown in FIGS. 26 and 27, attenuation and group delay of the power line are different in frequency bands. Therefore, some frequency bands are available and other frequency bands are not, for the multi-carrier communication apparatus that uses the transmission line such as the power line.

BPSK (Binary Phase Shift Keying) has been used as primary modulation of lowest spectral efficiency (1 bps/Hz) in the FFT-based OFDM. Sub-carriers having communication quality of below a BPSK threshold are masked and not used, thus causing a problem of deterioration in transfer efficiency.

The communication quality of sub-carriers is indicated by CINR (Carrier to Interference and Noise Ratio), CNR (Carrier to Noise Ratio), and the like. In the wavelet-based OFDM, 2PAM is used as a primary modulation scheme of lowest spectral efficiency (2 bps/Hz). Sub-carriers having CINRs below a 2PAM threshold are masked and not used. When a transmission line environment is poor, many sub-carriers are not used, thus causing a similar problem of deterioration in transfer efficiency. In addition to the problem, the wavelet-based OFDM, which uses 2PAM as primary modulation of the lowest spectral efficiency (2 bps/Hz), has no primary modulation comparable to BPSK in the FTT-based OFDM. Thus, the wavelet-based OFDM has a problem where a proportion of masked and unused sub-carriers is higher than the FTT-based OFDM.

DISCLOSURE OF THE INVENTION

In multi-carrier communication, there is the problem, as described above, where the transfer efficiency is attenuated, since the sub-carriers are masked and not used when the CINRs thereof are below the threshold of primary modulation that operates at the lowest spectral efficiency (BPSK or 2PAM). Further, in the wavelet-based OFDM, there is the problem where the proportion of the masked and unused sub-carriers increases, since the wavelet-based OFDM has no primary modulation scheme comparable to BPSK. The multi-carrier communication apparatus is thus required to recognize a transmission status and to further increase the transfer efficiency.

The embodiment examples are to provide a communication apparatus capable of improving the transfer efficiency by: recognizing transmission characteristics; reducing the number of masked sub-carriers; and exploiting diversity using a plurality of sub-carriers.

The embodiment examples relate to the communication apparatus performing communication using a multi-carrier signal. The communication apparatus includes a communication quality calculator, a sub-carrier detector, a sub-carrier extractor, and a multi-carrier signal transmitter. The communication quality calculator calculates communication quality corresponding to at least two sub-carriers respectively, out of a plurality of sub-carriers included in the multi-carrier signal. The sub-carrier detector compares each of the communication quality calculated by the communication quality calculator with a threshold, and that detects a plurality of sub-carriers corresponding to lower communication quality than the threshold, based on the comparison result. The sub-carrier extractor extracts at least two sub-carriers from the plurality of sub-carriers detected by the sub-carrier detector, so that the communication quality exceeds the threshold. The multi-carrier signal transmitter assigns same data to the sub-carriers extracted by the sub-carrier extractor, and that transmits the sub-carriers as the multi-carrier signal.

The communication apparatus according to embodiment examples uses at least two sub-carriers from the sub-carriers having low communication quality, so that the communication quality exceeds the threshold; and performs multi-carrier communication taking advantage of diversity. The communication apparatus is thus capable of performing multi-carrier communication in which the predetermined error rate is maintained, while efficiently using the sub-carriers having low communication quality.

BEST MODE FOR CARRYING OUT THE INVENTION

Described below are embodiments with reference to FIGS. 1 to 21. In the embodiments below, a power line is used as one example of a wired transmission line. Although the wired transmission line is suitable for communication, the present invention does not limit the transmission line to the wired type. The communication apparatus described in the embodiments performs channel estimation before or during a communication as required. Based on the channel estimation result, a receiving apparatus determines a primary modulation scheme applied to each sub-carrier and generates a tone map associated with the result. The receiving and transmitting apparatuses retain the same tone map so as to perform optimal communication suitable for transmission characteristics.

First Embodiment

Figure 1:
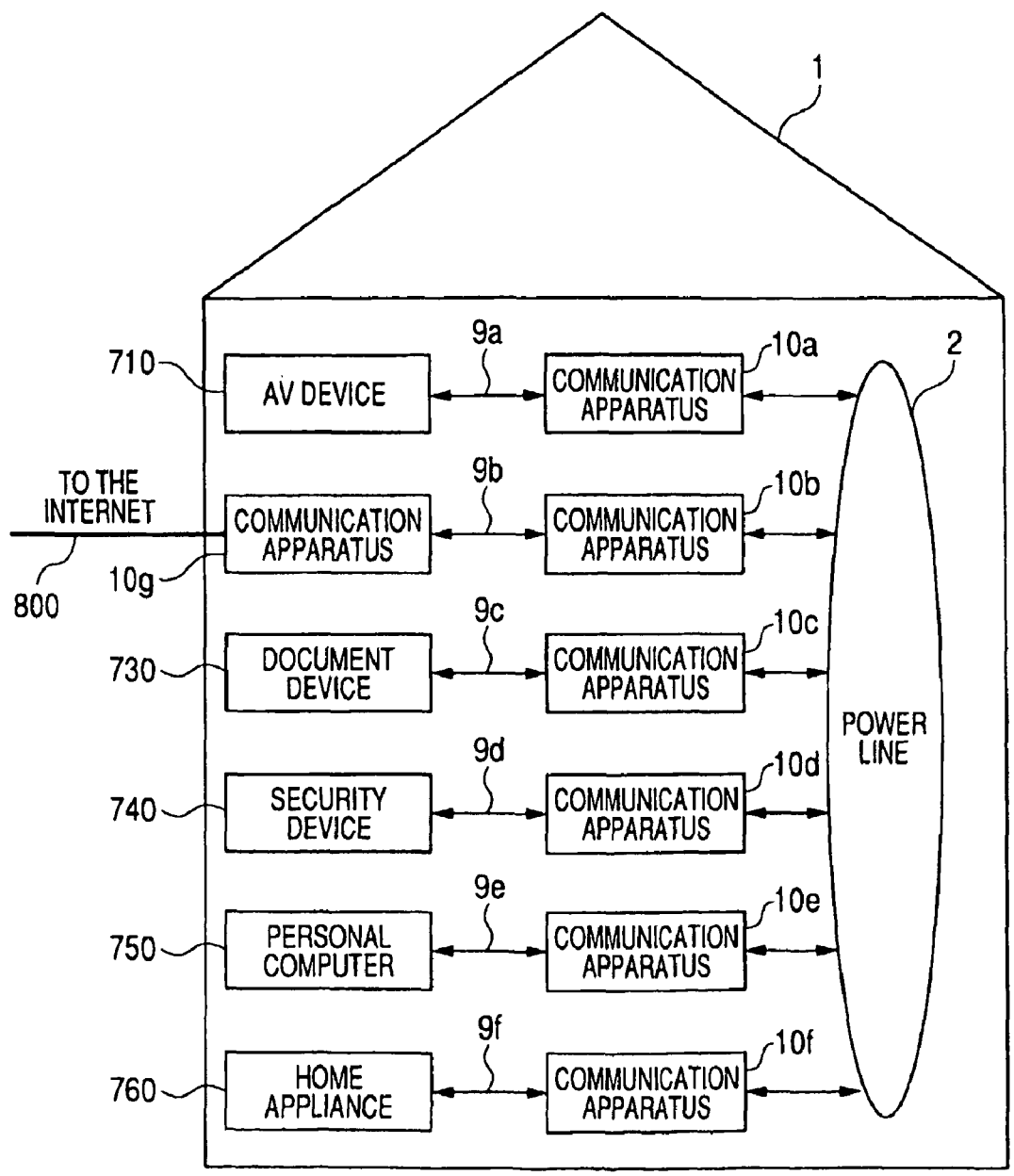
FIG. 1 is a system chart that includes communication apparatuses according to a first embodiment.

FIG. 1 is a system chart that includes communication apparatuses according to a first embodiment. Communication apparatuses 10 use power lines 2 as transmission lines. That is, communication apparatuses 10 are, for example, a modem or a module for power line communication. Further included is AV device 710. One of communication apparatuses 10 connects Internet 800 and an internal network inside house 1. Internet 800 is an external network, such as, for example, an ADSL modem, a CATV media converter, and the like. Furthermore included are document device 730, security device 740, personal computer 750, and home appliance 760. Devices 710 to 760 configure the internal network on power lines 2 via communication apparatuses 10, thereby capable of performing linked operation and the like over the network. The embodiment example allows communication among devices 710 to 760 on the network system described as above via power lines 2, and uses a communication method described in detail below in the communication.

Figure 2:
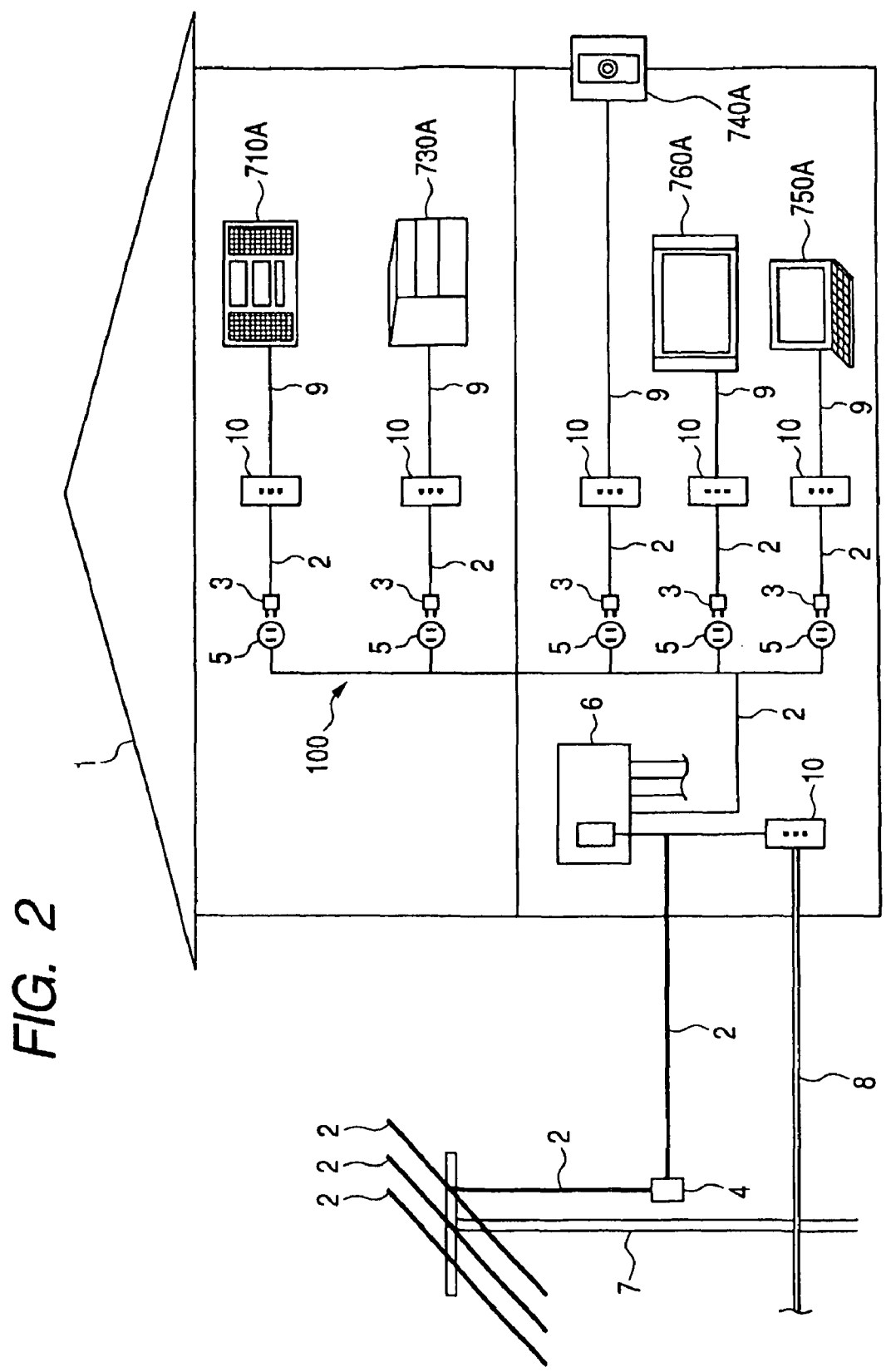
FIG. 2 is a detailed system chart that includes the communication apparatuses according to the first embodiment.

FIG. 2 is a detailed system chart that includes communication apparatuses 10 according to the first embodiment. As shown in FIG. 2, communication system 100 includes the network using power lines 2 as the transmission lines. Power lines 2 include a power cable that connects to utility pole 7 outdoors; a lead-in cable that connects to the power cable via transformer 4; and indoor wiring provided in house 1. The power cable portion of power lines 2 connects to power distribution panel 6 via the lead-in line portion of power lines 2. Further, optical cable 8, which connects to an ISP (Internet Service Provider; not shown in the figure) or the like, connects to power distribution panel 6 via modem 10.

Power lines 2 from power distribution panel 6 connect to a plurality of outlets 5 provided inside house 1. A plurality of modems having different communication schemes are connected to respective outlets 5 via plugs 3 and power lines 2. Power lines 2 supply a commercial alternating voltage of, for example, 120V 60 Hz, to a various types of electric devices. However, as long as alternating voltage is supplied, the voltage does not have to be 120V 60 Hz. A variety of conditions is thus applicable, such as 100V AC 60 Hz (or 50 Hz) in Japan, 110V AC/220V AC 50 Hz in China, and so forth.

The plurality of modems 10a, 10b, 10c, 10d, 10e, 10f are provided in house 1. A plurality of electric devices 710A, 10g, 730A, 740A, 750A, and 760A are connected to respective modems 10a, 10b, 10c, 10d, 10e, 10f via LAN cables 9a, 9b, 9c, 9d, 9e, 9f. Mini-component set 710A, as an example of AV device 710, includes an amplifier and speakers. Printer 730A is an example of document device 730. Network camera 740A, as an example of security device 740, can be connected to the network. Laptop computer 750A is an example of personal computer 750. Television set 760A, as an example of home appliance 760, has an LCD or plasma screen.

The present embodiment describes the modem as an example of communication apparatus 10. However, communication apparatus 10 is not limited to the modem, and may be an apparatus having a communication function. For example, an electric device having a modem function (specifically, various types of electric devices 710A, 720A, 730A, and the like shown in FIG. 2) may be used.

Figure 3:
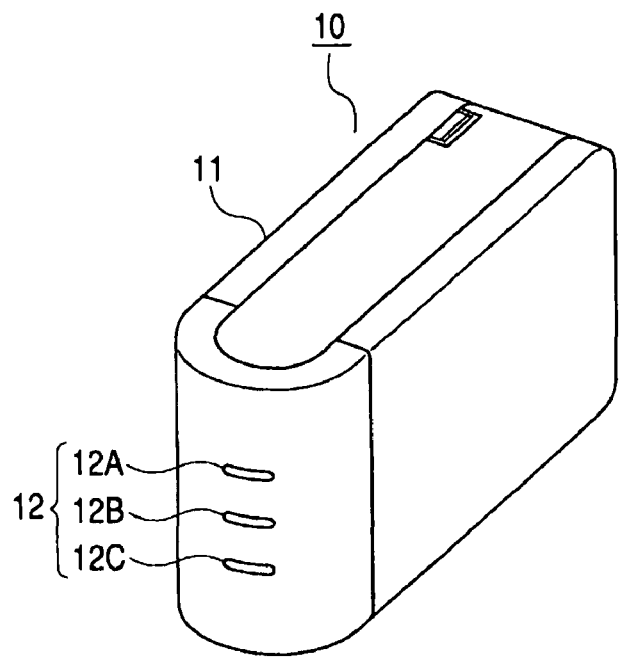
FIG. 3 is an external perspective view of the modem.
Figure 4:
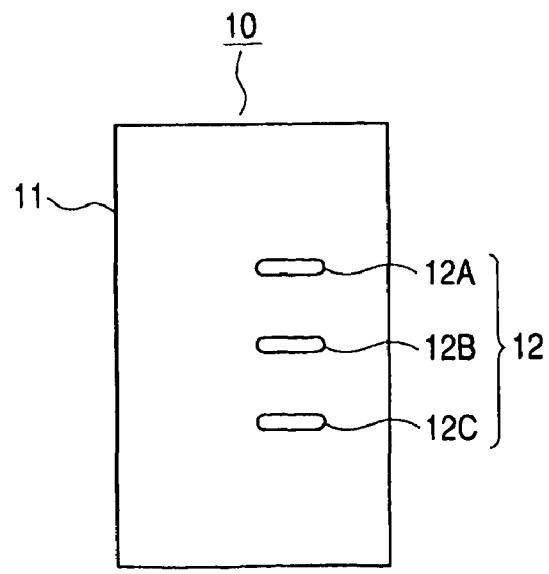
FIG. 4 is a front view of the modem.
Figure 5:
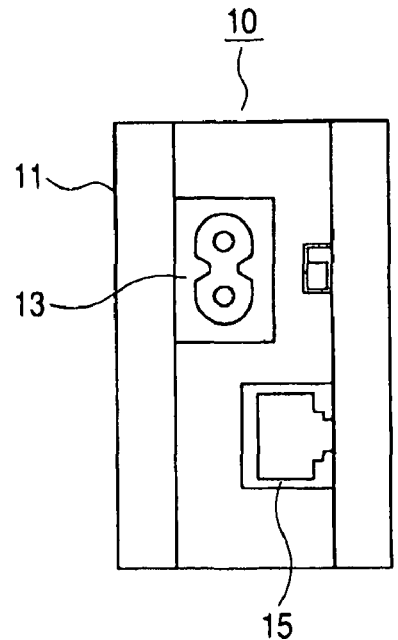
FIG. 5 is a rear view of the modem.

FIG. 3 is an external perspective view of the modem; FIG. 4 is a front view of the modem; and FIG. 5 is a rear view of the modem. As shown in FIG. 3, modem 10 has chassis 11. On a front panel of chassis 11, display 12 that includes three LEDs (Light Emitting Diodes) 12A, 12B, and 12C is provided as shown in FIG. 4. On a rear panel of chassis 11, power connector 13 and LAN (Local Area Network) modular jack 15, such as, for example, RJ45, are provided as shown in FIG. 5. To power connector 13, the power line, such as a parallel cable (e.g., a VVF cable) and the like, is connected. To modular jack 15, a LAN cable is connected.

Figure 6:
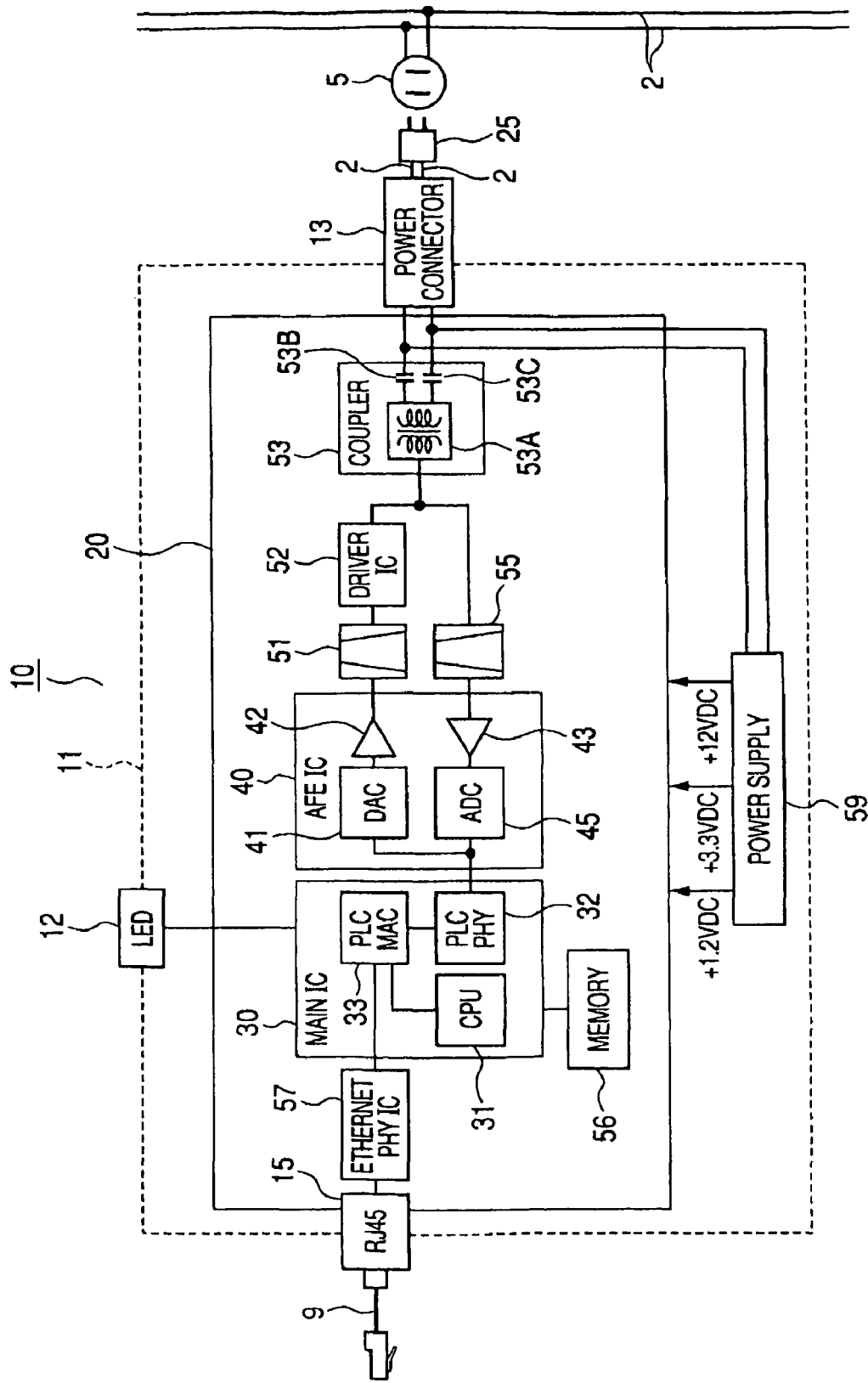
FIG. 6 is a block diagram illustrating an example of hardware that configures the modem of the first embodiment.

FIG. 6 is a block diagram illustrating an example of hardware that configures modem 10 of the first embodiment. As shown in FIG. 6, modem 10 includes circuit module 20 and power supply (switching regulator) 59. Power supply 59 has a DC/DC converter and supplies a variety of voltages (e.g., +1.2V, +3.3V, and +12V) to circuit module 20. Circuit module 20 includes main IC (Integrated Circuit) 30, AFE IC (Analog Front End IC) 40, band path filter 51, driver IC 52, coupler 53, band path filter 55, memory 56, and Ethernet® PHY IC 57. Power connector 13 connects to power line 2 via plug 3 and outlet 5.

Main IC 30 is an integrated circuit (LSI) that performs basic control for data communication and signal processing, including modulation/demodulation. Specifically, main IC 30 includes CPU (Central Processing Unit) 31, PLC MAC (Power Line Communication Media Access Control layer) block 33, and PLC PHY (Power Line Communication Physical layer) block 32. CPU 31 is mounted with a 32-bit RISC (Reduced Instruction Set Computer). PLC MAC block 33 controls the MAC layer, and PLC PHY block 32 controls the PHY layer. AFE IC 40 includes D/A converter (DAC) 41, variable gain amplifiers (VGA) 42 and 43, and A/D converter (ADC) 45. Coupler 53 includes coil transformer 53A and coupling capacitors 53B and 53C.

Figure 7:
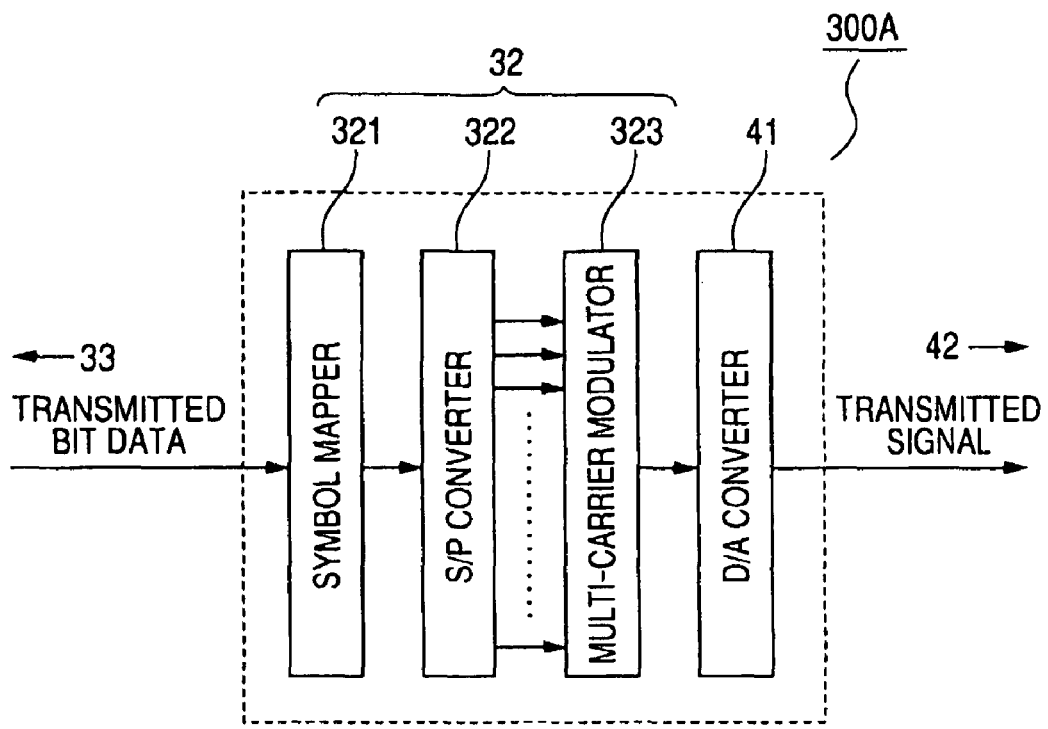
FIG. 7 is a block diagram of a transmitting circuit according to the first embodiment.

FIG. 7 is a block diagram of a transmitting circuit according to the first embodiment. Transmitting circuit 300A includes each portion of functions of PLC PHY block 32 and AFE IC 40. Specifically, transmitting circuit 300A includes symbol mapper 321, serial/parallel converter (S/P converter) 322, multi-carrier modulator 323, and D/A converter 41, as show in FIG. 7.

In transmitting circuit 300A, symbol mapper 321 converts transmitted bit data into symbol data and, based on the symbol data, performs symbol mapping, that is, QAM (Quadrature Amplitude Modulation) or PAM (Pulse Amplitude Modulation). Serial/parallel converter (S/P converter) 322 converts a signal from serial to parallel, and then multi-carrier modulator 323 transforms the signal from a frequency domain to a time domain using IFFT (Inverse Fast Fourier Transform) or IDWT (Inverse Discrete Wavelet Transform). D/A converter 41 then converts the signal from a sampled value system in a time-axis waveform to a baseband analog signal waveform that continues temporally, and then transmits the signal as a transmitted signal.

Figure 8:
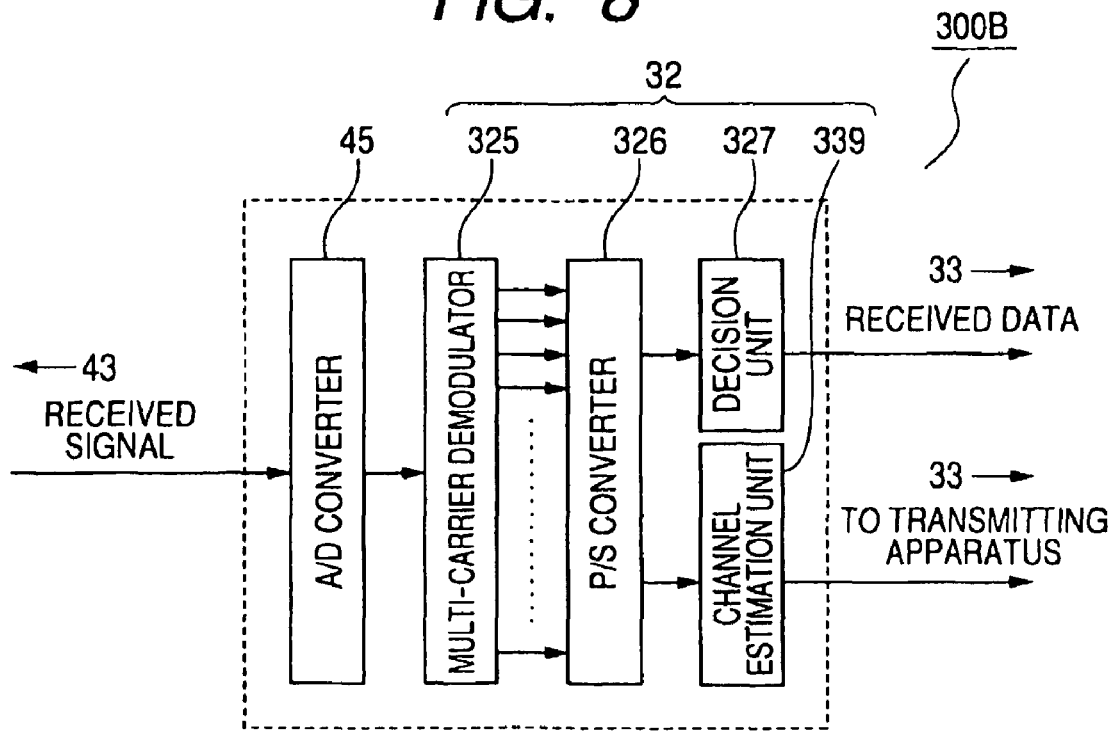
FIG. 8 is a block diagram of a receiving circuit according to the first embodiment.

FIG. 8 is a block diagram of a receiving circuit according to the first embodiment: Receiving circuit 300B includes each portion of the functions of PLC PHY block 32 and AFE IC 40. Specifically, receiving circuit 300B includes A/D converter 45, multi-carrier demodulator 325, parallel/serial converter (P/S converter) 326, decision unit 327, and channel estimation unit 329, as shown in FIG. 8.

In receiving circuit 300B, A/D converter 45 converts a received signal into a digital signal. Then, multi-carrier demodulator 325 transforms the signal from the time domain to the frequency domain using FFT (Fast Fourier Transform) or DWT (Discrete Wavelet Transform), and synchronizes and equalizes the signal so that the received signal is demodulated for decision. Channel estimation unit 329 estimates a transmission status based on the demodulated received signal, and decision unit 327 decides the demodulated received signal using a threshold. When communicating, a receiving apparatus performs channel estimation as required, before or during a communication. Then, the receiving apparatus determines primary modulation schemes applied to respective sub-carriers based on the results of channel estimation, and generates a tone map according to the results. The transmitting and receiving circuits retain the same tone map, so as to perform an optimal communication suitable for transmission characteristics.

Figure 9:
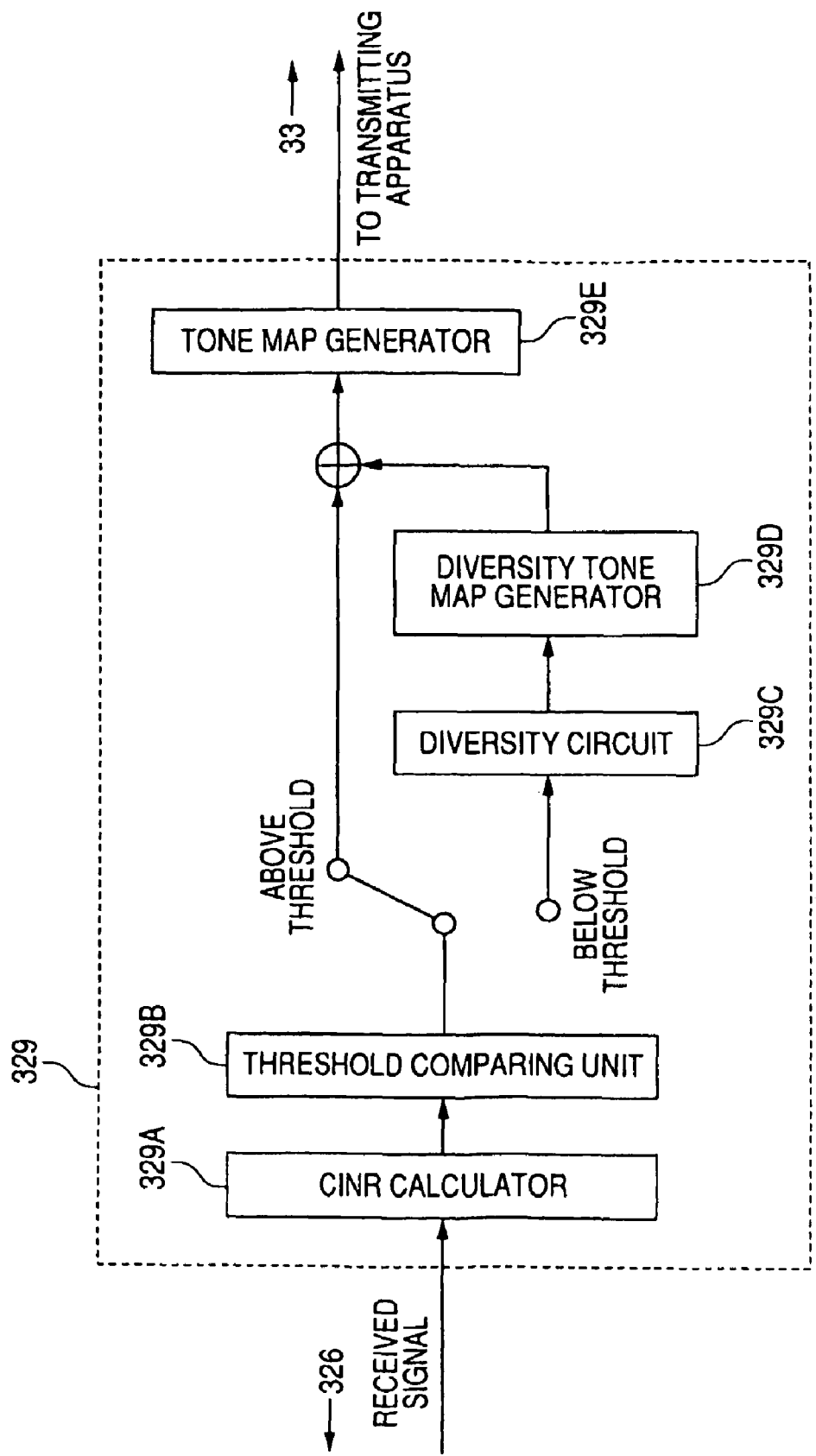
FIG. 9 is a block diagram of a channel estimation unit according to the first embodiment.

FIG. 9 is a block diagram of channel estimation unit 329 according to the first embodiment. In FIG. 9, channel estimation unit 329 includes CINR calculator 329A, threshold comparing unit 329B, diversity circuit 329C, diversity tone map generator 329D, and tone map generator 329E.

In primary modulation, symbol mapper 321 on the communication apparatus applies digital modulation schemes, including BPSK (Binary Phase Shift Keying), QPSK (Quadrature Phase Shift Keying), 16QAM, 64QAM, 256QAM, and the like. In modulation processing, multi-carrier modulator 323 uses the IFFT for transformation from the frequency domain to the time domain. In demodulation processing, multi-carrier demodulator 325 uses the FFT for transformation from the time domain to the frequency domain.

Figure 10:
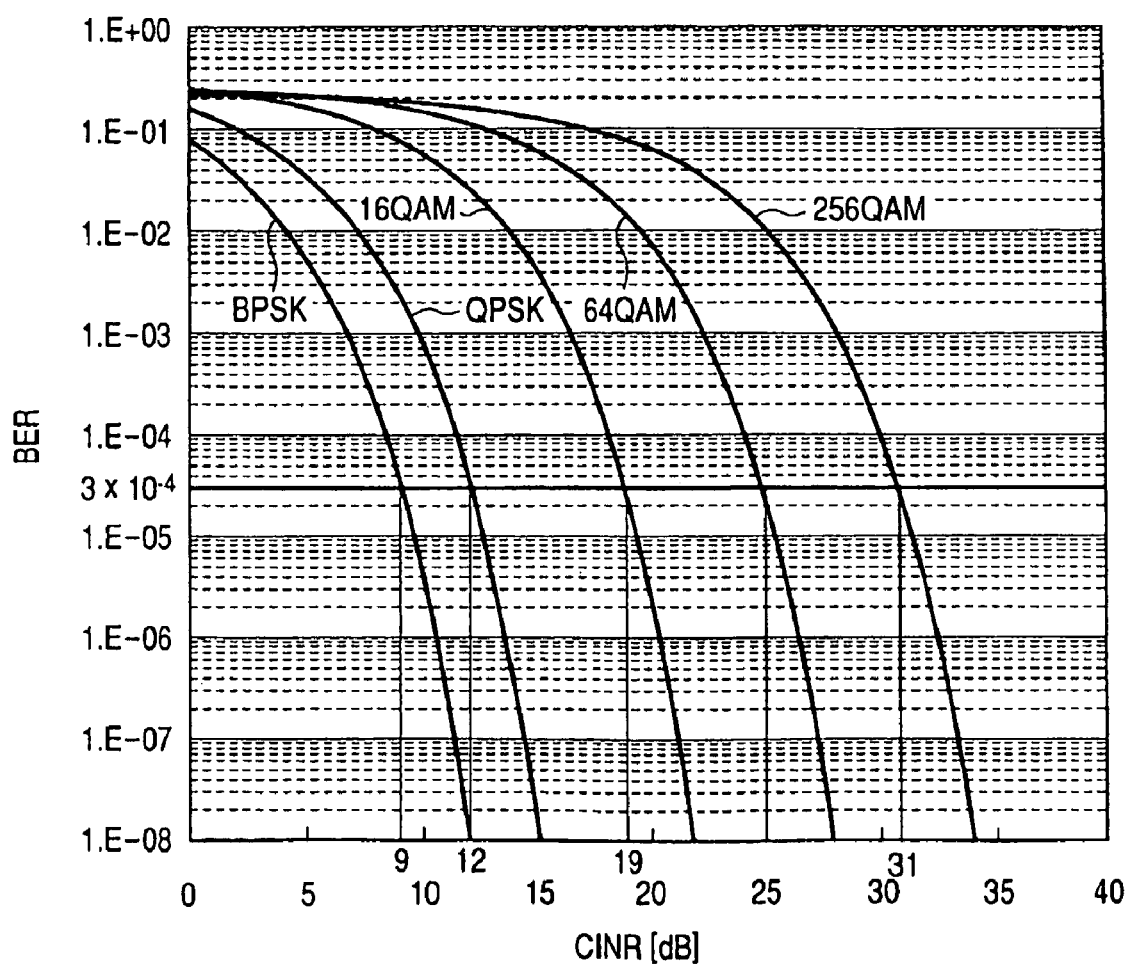
FIG. 10 illustrates an error rate to CINR.

FIG. 10 shows an error rate in relation to CINR. A vertical axis shows a BER (Bit Error Rate), which is one example of the error rate. A horizontal axis shows the CINR, which is one example of communication quality associated with sub-carriers. The digital modulation schemes, including BPSK, QPSK, 16QAM, 64QAM, and 256QAM, are employed for primary modulation in the figure. With any of the digital modulation schemes, the BER increases as noise characteristics deteriorate (i.e., as the CINR becomes lower). Particularly in the digital modulation schemes, the higher multi-level of the digital modulation schemes is, the more it is sensitive to noise. CINR thresholds associated with a predetermined BER are set in channel estimation. When the predetermined BER is $3.0 \times 10^{-4}$, for instance, the thresholds for BPSK, QPSK, 16QAM, 64QAM, and 256QAM are 9 dB, 12 dB, 19 dB, 25 dB, and 31 dB respectively. Namely, the "thresholds" mean communication quality capable of maintaining the predetermined error rate in the predetermined digital modulation schemes. The error rate is not limited to the BER, but may be a symbol error rate, for example.

CINR calculator 329A calculates CINRs (Carrier to Interference and Noise Ratios) on the respective sub-carriers based on the received signal, which is demodulated by multi-carrier demodulator 325. Threshold comparing unit 329B then compares the CINRs of the respective sub-carriers output from CINR calculator 329A, against the thresholds (e.g., 9 dB, 12 dB, 19 dB, 25 dB, and 31 dB) for determining the primary modulation schemes applied to the respective sub-carriers; and determines the primary modulation schemes applied to the respective sub-carriers. For instance, when a sub-carrier has a CINR of 20 dB, which exceeds the thresholds of 9 dB, 12 dB, and 19 dB, one of BPSK, QPSK, or 16QAM, is selectable. In the description, a digital modulation scheme of a highest multi-level among the plurality of selectable digital modulation schemes is set to be selected for primary modulation, and thus 16QAM is selected as the primary modulation scheme.

Using a plurality of sub-carriers having CINRs below a lowest threshold level (a BPSK threshold in the description) based on the output from threshold comparing unit 329B, diversity circuit 329C forms a sub-carrier group so that combined CINR (a description thereof follows) of the sub-carriers is above the lowest threshold (a description thereof follows). Based on the output from diversity circuit 329C, diversity tone map generator 329D generates (extracts) a tone map associated with the lowest primary modulation scheme. Based on the output from threshold comparing unit 329B and diversity tone map generator 329D, tone map generator 329E generates a tone map associated with the primary modulation schemes applied to the respective sub-carriers.

In the first embodiment, the communication quality calculator performs calculation using the CINR. However, the calculation does not need to be based on the CINR. The calculation may be based on other ratios that allow appropriate assessing of the communication quality of the sub-carriers or the transmission status, including CNR (Carrier to Noise Ratio), S/N ratio (Signal to Noise ratio), and the like, although the CINR is preferable.

Figure 11:
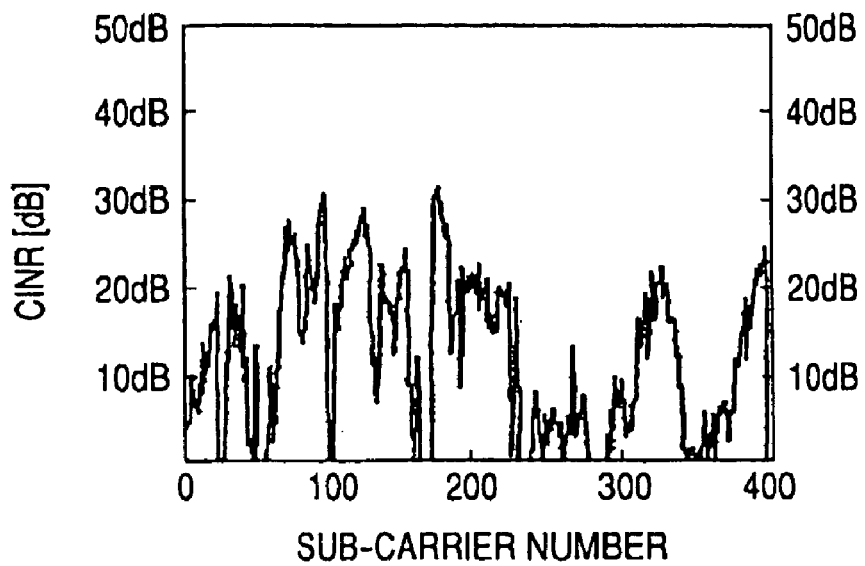
FIG. 11 illustrates a relationship between sub-carriers received on a receiving apparatus and the CINR.

Described below is operation of the communication apparatus configured as above with reference to FIGS. 9 to 11.

In channel estimation unit 329 of FIG. 9, CINR calculator 329A calculates the CINRs on the respective sub-carriers based on the received signal, which is demodulated in multi-carrier demodulator 325 of receiving circuit 300B. FIG. 11 shows a relationship between the sub-carriers received on receiving circuit 300B and the CINR. As shown in FIG. 11, the CINRs calculated from the respective sub-carriers vary since the respective sub-carriers are affected by the transmission characteristics. Threshold comparing unit 329B then compares the CINRs of the respective sub-carriers with the respective thresholds for primary modulation, and determines the primary modulation schemes for the respective sub-carriers.

Figure 12:
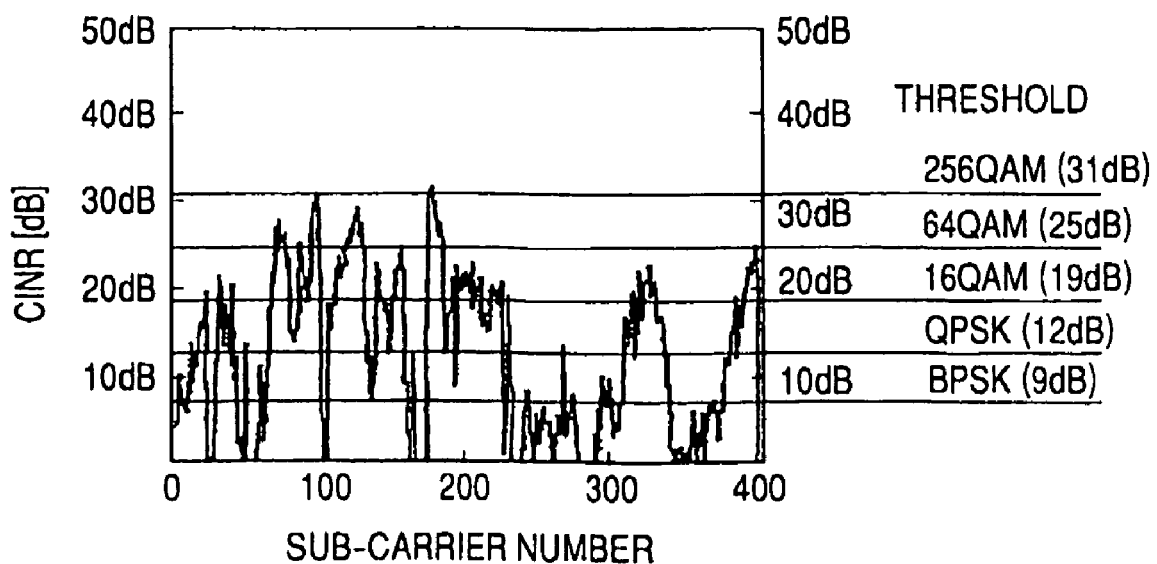
FIG. 12 illustrates a relationship between the CINR and thresholds for determining primary modulation schemes.

FIG. 12 shows a relationship between the CINR and the thresholds for determining the primary modulation schemes. As shown in FIG. 12, threshold comparing unit 329B compares the CINRs of the respective sub-carriers with the thresholds for determining the primary modulation schemes, and determines the primary modulation schemes applied to the respective sub-carriers. For a sub-carrier below the lowest threshold (BPSK in the figure), however, no primary modulation scheme is determined and a CINR thereof is output as is. The "lowest threshold" means the threshold of the lowest multi-level modulation scheme among the plurality of thresholds. Then, diversity circuit 329C uses (extracts) a plurality of sub-carriers having CINRs below the lowest threshold (the BPSK threshold in the figure) based on the output from threshold comparing unit 329B, and forms a sub-carrier group so that the combined CINR (the description thereof follows) of the sub-carriers is above the lowest threshold.

Further, diversity tone map generator 329D generates the tone map associated with the lowest primary modulation scheme, based on the output from diversity circuit 329C.

Figure 13:
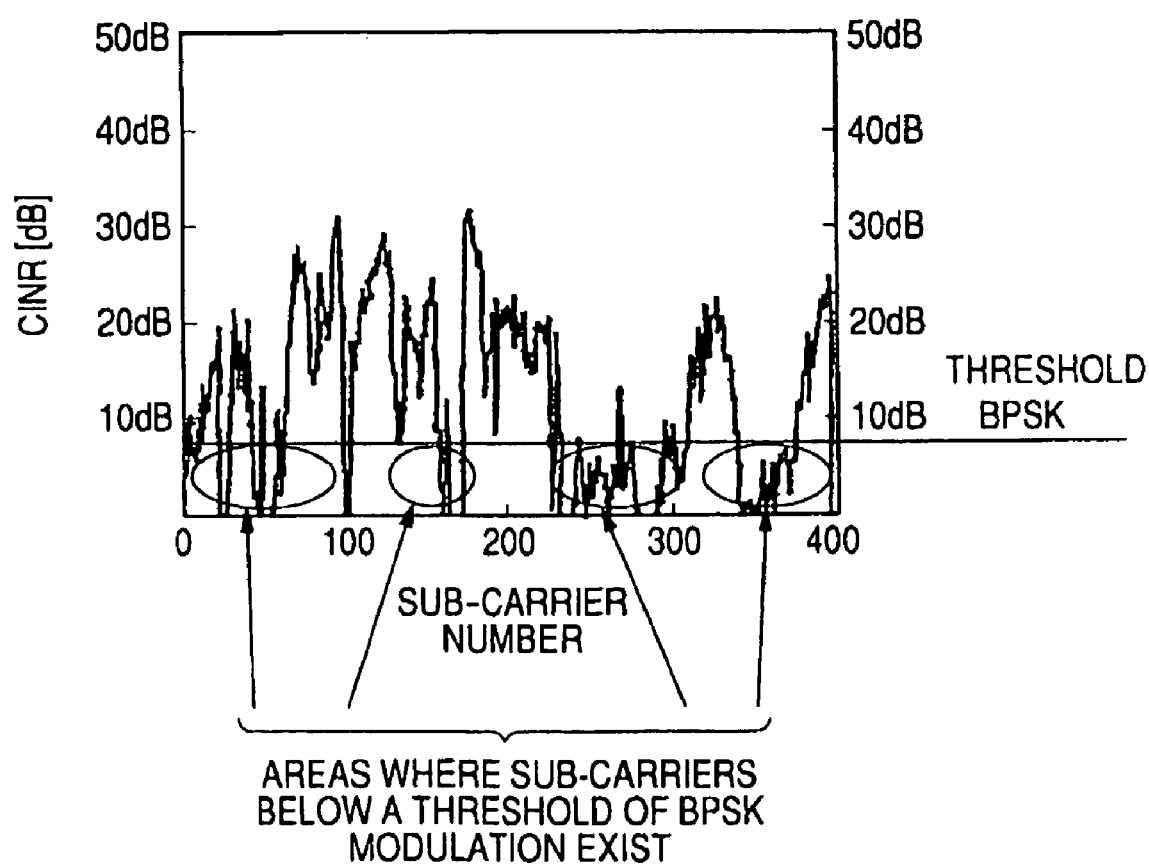
FIG. 13 illustrates sub-carriers having CINRs below a lowest threshold.

In the process, transmitting circuit 300A needs to map identical information (data) to the same sub-carrier group to which the lowest primary modulation scheme is applied. To that end, diversity tone map generator 329D needs to generate a diversity tone map, so as to distinguish the lowest primary modulation scheme applied to the sub-carrier group from the primary modulation schemes applied individually to the sub-carriers above the threshold. FIG. 13 is a block diagram illustrating the sub-carriers having the CINRs below the lowest threshold.

Figures 14, 15:
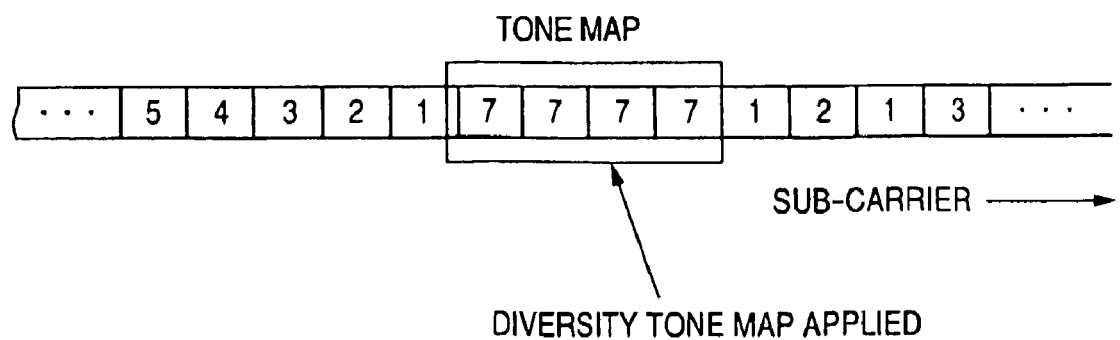
FIG. 14 is an example of sub-carriers and calculated CINRs.
FIG. 15 is an example of making a tone map.

The plurality of sub-carriers below the lowest threshold as shown in FIG. 13 are used to form the sub-carrier group, for which the diversity tone map is generated. Finally, tone map generator 329E generates the tone map used between the communication apparatuses, based on the results of the threshold decision for the respective sub-carriers above the threshold and on the diversity tone map. As a specific example, FIG. 14 shows an example of sub-carriers and calculated CINRs thereof. FIG. 15 shows an example of making a tone map. A horizontal axis in FIG. 15 is associated with sub-carrier numbers, and numbers in slots indicate primary modulation. In the figure, the numbers in the slots represent the following primary modulation schemes: "1" for BPSK, "2" for QPSK, "3" for 16QAM, "4" for 64QAM, "5" for 256QAM, and "7" for BPSK applied to a diversity tone map generated by diversity tone map generator 329D so as to be distinguished.

Further, sub-carrier groups need to be divided and assigned with numbers, such as 7, 8, 9, and the like, so as to be distinguished from one another. In the example, the lowest threshold is assumed 13 dB, and thus the sub-carriers having sub-carrier numbers 55, 56, 57, and 58 are below the threshold. Normally, the sub-carriers below the threshold are masked and not used for communication. In the example, diversity circuit 329C first calculates the combined CINR. The "combined CINR" means accumulated true values of power (or voltage) of the plurality of sub-carriers. Sub-carriers 55, 56, 57, and 58 have CINRs of 8 dB, 9.5 dB, 6 dB, and 3 dB respectively in the example. A sum of true values of power based on the CINRs, that is, the combined CINR, is 13.3 dB. Since the combined CINR of the four sub-carriers exceeds the lowest threshold, one sub-carrier group is formed of the sub-carriers; the identical primary modulation of the lowest efficiency (BPSK in the example) is applied to the four sub-carriers; and the diversity tone map is generated.

Finally, tone map generator 329E generates the tone map, including the diversity tone map, as shown in FIG. 15. The tone map generated in the process is retained by the transmitting and receiving apparatuses. The configuration described above effectively uses the frequency bands, which are normally masked and not used in communication due to low CINR, and thereby increases the transmission efficiency.

When forming the sub-carrier group based on calculation of the combined CINR in diversity circuit 329C, selecting sub-carriers as far apart as possible on a frequency domain (in other words, "frequency axis") lowers frequency correlation within the group and increases diversity effect, thereby improving the transmission efficiency.

In addition, maximizing the number of sub-carrier groups to be formed, that is, minimizing the number of sub-carriers in one group, further improves the transmission efficiency. To implement the improvement above, combined CINRs of the respective groups may be optimized so as to be near the threshold.

Moreover, it is possible to further improve the transmission efficiency when the sub-carriers are grouped so that the sub-carriers apart on the frequency domain are used and that the maximum number of sub-carrier groups is formed. To implement the improvement above, sub-carriers apart on the frequency domain are first grouped together; the sub-carriers are then selected from the groups apart on the frequency domain to form sub-carrier groups; and the combined CINRs of the respective sub-carrier groups are optimized so as to be near the threshold.

On the contrary, the sub-carrier groups may be formed by selecting the sub-carriers below the threshold in an order from low frequency or high frequency. Although the diversity effect more or less declines, the selecting method can reduce a circuit scale as requiring no complex conditional branching. Setting the number of sub-carriers included in the sub-carrier groups constant in the method further simplifies the processing and makes it easy to create a tone map since the sub-carrier groups no longer need to be distinguished from one another according to the number of sub-carriers included in the groups.

In the description above, multi-carrier modulation is based on the IFFT and multi-carrier demodulation is on the FFT. The same description may also apply when multi-carrier modulation is based on IDWT (Inverse Discrete Wavelet Transform) and multi-carrier demodulation is on DWT (Discrete Wavelet Transform).

The wavelet type described above includes the complex-value type, such as FMT (Filtered Multitone), Filtered OFDM, OFDM/OQAM and the like; and the real-value type, such as CMFB (Cosine Modulated Filter Bank) and the like. In the real-type Discrete Wavelet Transform, however, PAM, not QAM, is used as a primary modulation scheme.

Figure 16:
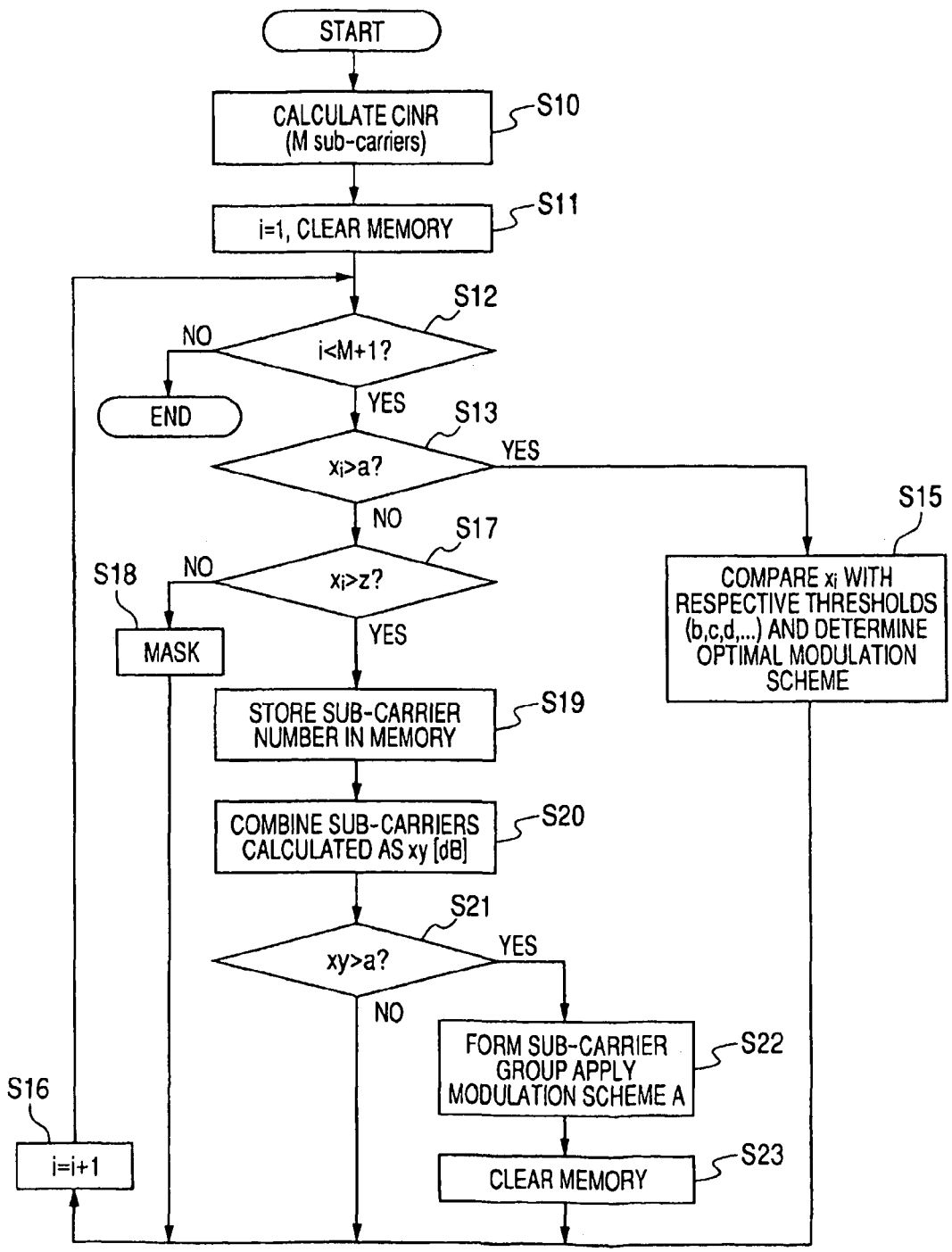
FIG. 16 is a flowchart illustrating detailed operation of the communication apparatus according to the first embodiment.

FIG. 16 is a flowchart illustrating detailed operation of communication apparatus 10 according to the first embodiment. Although partially overlapping with the above-described operation, the operation of communication apparatus 10 is described below based on FIG. 16 so as to provide full description.

The number of sub-carriers included in a multi-carrier signal per symbol is indicated as M, and sub-carrier numbers are as 1, 2, 3, . . . , M−1, and M. First, CINR calculator 329A calculates CINRs on sub-carriers 1 to M (step S10). A sub-carrier number whose CINR is compared and determined is indicated as "i." Channel estimation unit 329 sets "i" to "1," and clears the setting when the sub-carrier number is stored in memory 56 (step S11). Threshold comparing unit 329B determines whether or not i<M+1 is met (step S12). When i<M+1 is not met (step S12: No), that is, when the sub-carrier number whose CINR is compared and determined reaches M, the process ends.

On the other hand, when i<M+1 is met (step S12: Yes), that is, when the sub-carrier number whose CINR is compared and determined has yet to reach M, threshold comparing unit 329B compares the CINR $(x_i)$ of the sub-carrier whose CINR is compared and determined with the lowest threshold (a) (step S13). When the CINR is above the lowest threshold (step S13: Yes), threshold comparing unit 329B compares the CINR with the respective thresholds and determines an optimal modulation scheme (step S15). The process for determining the modulation scheme, which was already described, is omitted here. When the modulation scheme is determined, channel estimation unit 329 increments the sub-carrier number (i) (step S16).

After threshold comparing unit 329B increments the sub-carrier number (i), the process returns to step S12. When the sub-carrier number is incremented from "1" to "2," the process returns to step S13 since the sub-carrier number whose CINR is compared and determined has yet to reach M. When the CINR is below the lowest threshold (step S13: No), threshold comparing unit 329B compares the CINR $(x_i)$ of the sub-carrier whose CINR is compared and determined with a threshold below the lowest threshold (z; e.g., 1 dB) (step S17). When the CINR $(x_i)$ is below the threshold (z) (step S17: No), channel estimation unit 329 masks the sub-carrier whose CINR has been compared and determined. The process reduces a processing load in extracting sub-carriers when a large number of poor sub-carriers exist in a predetermined frequency band among available frequency bands. Step S17 may be omitted.

On the other hand, when the CINR $(x_i)$ is above the threshold (z) (step S17: Yes), diversity circuit 329C stores in memory 56 the number of the sub-carrier whose CINR is compared and determined. Diversity circuit 329C retrieves all the sub-carrier numbers stored in memory 56. As the process above is repeated, a plurality of sub-carriers are detected, and the numbers of the detected sub-carriers are stored in memory 56. Diversity circuit 329C then calculates the combined CINR (xy) based on the CINRs associated with the sub-carrier numbers (step S20). Diversity circuit 329C compares the combined CINR (xy) with the lowest threshold (a) (step S21). When the combined CINR (xy) is below the lowest threshold (a) (step S21: No), the process returns to step S16.

For example, the lowest threshold (a) is 7 dB, and the CINRs of the four sub-carrier numbers stored in memory 56 are 0.5 dB. In this case, the combined CINR is 6.5 dB. Since the combined CINR (xy) is below the lowest threshold (a), the process returns to step S16. That is, the CINR power is added until the combined CINR (xy) reaches the lowest threshold (a). In other words, a plurality of sub-carriers are extracted so that the combined CINR exceeds the lowest threshold. As far as two or more sub-carriers are selected, the desired number of sub-carriers may be extracted from all the sub-carriers included in one symbol.

When the combined CINR (xy) is above the lowest threshold (a) (step S21: Yes), diversity tone map generator 329D applies the primary modulation of the lowest efficiency (BPSK in the description) so as to generate a diversity tone map. The process described above is repeated until the sub-carrier number reaches M, then the process ends. As described earlier, tone map generator 329E generates a tone map, including the diversity tone map. Based on the generated tone map, PLC MAC block 33 assigns identical data to the sub-carriers associated with the diversity tone map, and outputs the sub-carriers as a multi-carrier signal via plug 3 to power line 2.

In the first embodiment, multi-carrier communication is performed as described above, by exploiting diversity, that is, using two or more sub-carriers from the sub-carriers having low communication quality indicated by the CINR or the like, so that the communication quality exceeds the threshold. Thus, the multi-carrier communication can be performed as the predetermined error rate is maintained, while the sub-carriers having low communication quality are efficiently used. Particularly, the predetermined error rate is maintained in the digital modulation scheme of the lowest multi-level, thus allowing further efficient use of the sub-carriers having low communication quality.

Figure 17:
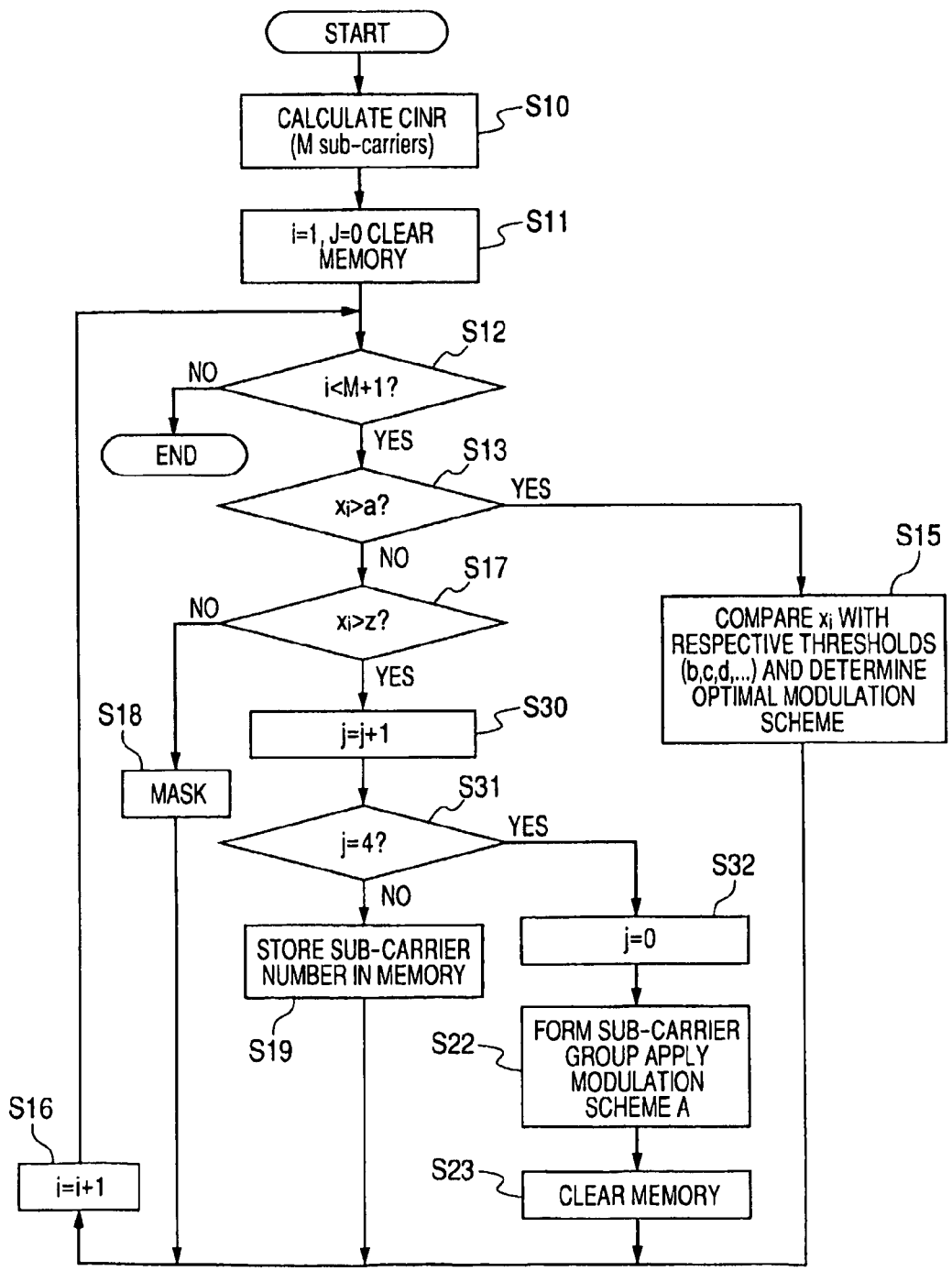
FIG. 17 is a flowchart illustrating a modified example of the operation of the communication apparatus according to the first embodiment.

In FIG. 16 that shows the operation of the first embodiment, the CINRs are combined until the combined CINR reaches the lowest threshold. However, the operation is not limited as above. It is possible, for example, to set the number of sub-carriers constant for combining the CINRs. Operation when the number of sub-carriers is constant is described below based on FIG. 17. FIG. 17 is a flowchart illustrating a modified example of the operation of communication apparatus 10 according to the first embodiment. In FIG. 17, a process same as shown in FIG. 16 is provided with same reference numbers, and only a different process (steps S30 to S32) is described.

When the CINR (j) is above the threshold (z) (step S17: Yes), iversity circuit 329C increments "j," which was set to "0" (step S30). Diversity circuit 329C then determines whether or not "j," which has been incremented reaches "4" (step S31). When "j" does not reach "4" (step S31: No), diversity circuit 329C stores in memory 56 the number of the sub-carrier whose CINR is compared and determined (step S19). On the other hand, when "j" reaches "4" (step S31: Yes), diversity circuit 329C resets "j" to "0" (step S32). Since memory 56 stores the four sub-carrier numbers, diversity tone map generator 329D applies the primary modulation of the lowest efficiency (BPSK in the description) associated with the four sub-carriers so as to generate the diversity tone map. The process as above eliminates calculation of the combined CINR and comparison and determination of the CINRs, thus simplifying the processing.

In the modified example, the threshold (z) needs to be set so that the combined CINR of the constant number of sub-carriers exceeds the lowest threshold. The threshold (z) may be set appropriately according to the transmission status. When the threshold (z) is set to at least 1 dB in an AWGN (Added White Gaussian Noise) environment, however, the present invention can function effectively.

Second Embodiment

Figure 18:
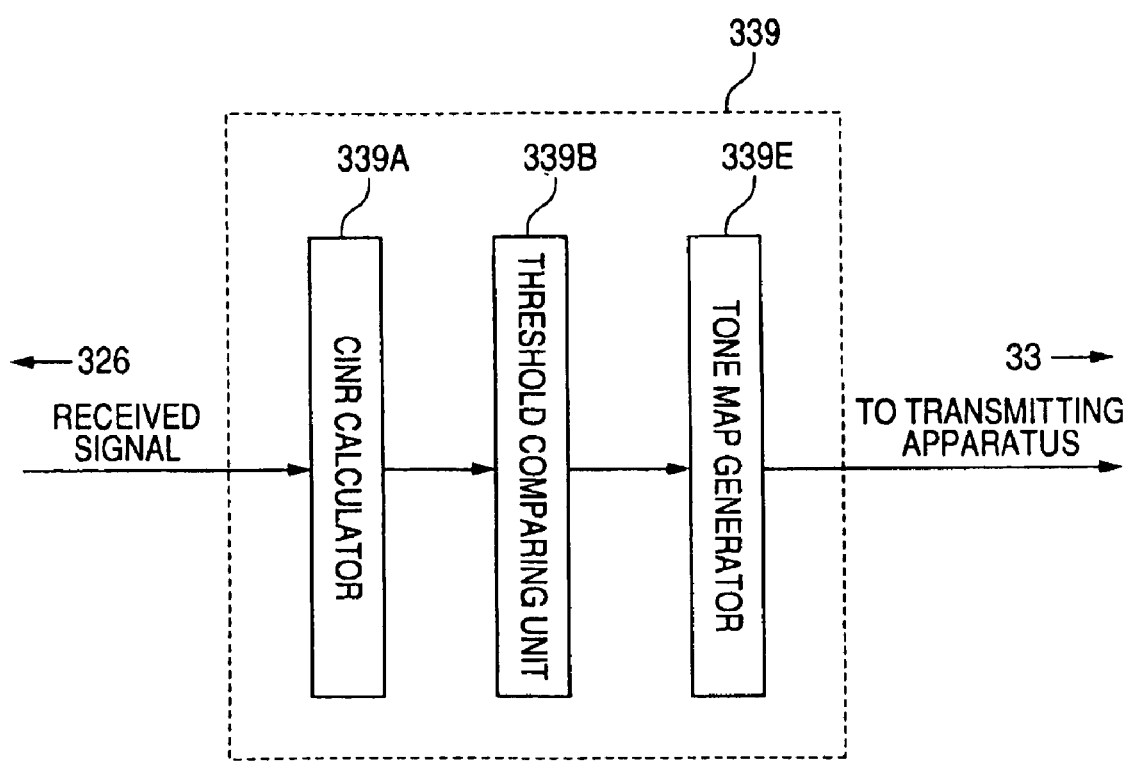
FIG. 18 is a block diagram of a channel estimation unit according to a second embodiment.

FIG. 18 is a block diagram of a channel estimation unit according to a second embodiment. A communication apparatus is identical to a communication apparatus of the first embodiment.

However, primary modulation used in a symbol mapper of the communication apparatus includes 2PAM (Pulse Amplitude Modulation), 4PAM, 8PAM, 16PAM, and the like. A multi-carrier modulator uses IDWT (Inverse Discrete Wavelet Transform) for transformation from a frequency domain to a time domain in modulation processing. A multi-carrier demodulator uses DWT (Discrete Wavelet Transform) for transformation from the time domain to the frequency domain in demodulation processing. Further, a real-value type Cosine Modulated Filter Bank is used as wavelet transform.

In FIG. 18, CINR calculator 339A calculates CINRs on respective sub-carriers based on a received signal, which is demodulated by multi-carrier demodulator 325. Threshold comparing unit 339B compares the CINRs of the respective sub-carriers output from CINR calculator 339A, with thresholds for determining the primary modulation schemes applied to the respective sub-carriers; and determines the primary modulation schemes applied to the respective sub-carriers. Tone map generator 339E controls a tone map based on a sub-carrier pair, which is formed of two sub-carriers, and generates the tone map based on results from threshold comparing unit 339B.

Described below is operation of the communication apparatus configured as above with reference to FIGS. 18 and 19. On channel estimation unit 339 of FIG. 18, CINR calculator 339A first calculates the CINRs on the respective sub-carriers based on the received signal, which is demodulated by multi-carrier demodulator 325 of a receiving apparatus. Further, threshold comparing unit 339B compares the CINRs of the respective sub-carriers with the respective thresholds of the primary modulation schemes, and determines the primary modulation schemes applied to the respective sub-carriers. For a sub-carrier of below a lowest threshold (2PAM in the description), however, no primary modulation scheme is determined and a CINR thereof is output as is.

Then, tone map generator 339E controls the two sub-carriers as the sub-carrier pair. When the CINRs of the both sub-carriers exceed the lowest threshold based on the output from threshold comparing unit 339B, a tone map is independently generated, which is associated with primary modulation schemes determined based on the CINRs of the respective sub-carriers. When the CINR of only one of the sub-carriers is below the threshold, the sub-carrier is masked. Further, when the CINRs of the both sub-carriers are below the lowest threshold, the combined CINR of the sub-carrier pair is calculated and compared with the lowest threshold. When the combined CINR is above the lowest threshold, an identical tone map associated with the primary modulation scheme of the lowest efficiency (2PAM in the description) is applied to the both sub-carriers. In the process, the tone map needs to be generated in a similar manner as in FIG. 15 of the first embodiment, so as to be distinguished from the primary modulation scheme of the lowest efficiency not selected for the combined CINR. When the combined CINR is below the lowest threshold, the sub-carrier pair is masked.

Figure 19:
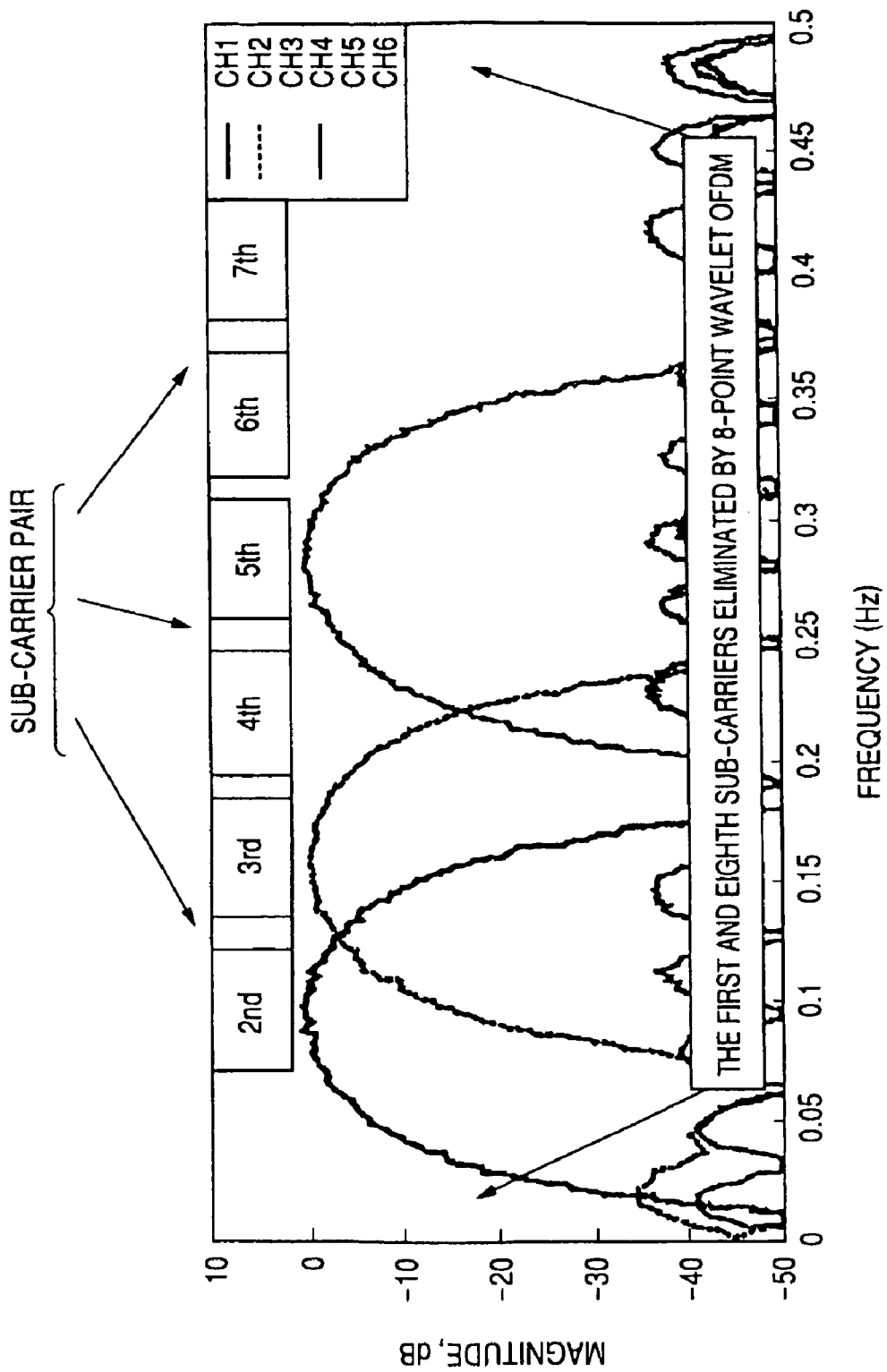
FIG. 19 is an example of forming sub-carrier pairs.

An example of forming sub-carrier pairs is illustrated in FIG. 19, which shows a spectrum when 8-point wavelet transformation is applied. In the example, a first sub-carrier and an $M^{-th}$ sub-carrier are masked without being included in the pairs. M shows the number of wavelet transformation points (eight in the example). The number of wavelet transformation points is generally a power of two so as to simplify a circuit configuration.

The first sub-carrier is unable to be used as a sub-carrier, since the first sub-carrier, which is direct current, is unable to carry phase information. Further, the $M^{-th}$ sub-carrier is unsuitable as a sub-carrier due to a masking problem. It is therefore preferable to form the sub-carrier pairs using second through $(M-1)^{-th}$ sub-carriers.

Figure 20:
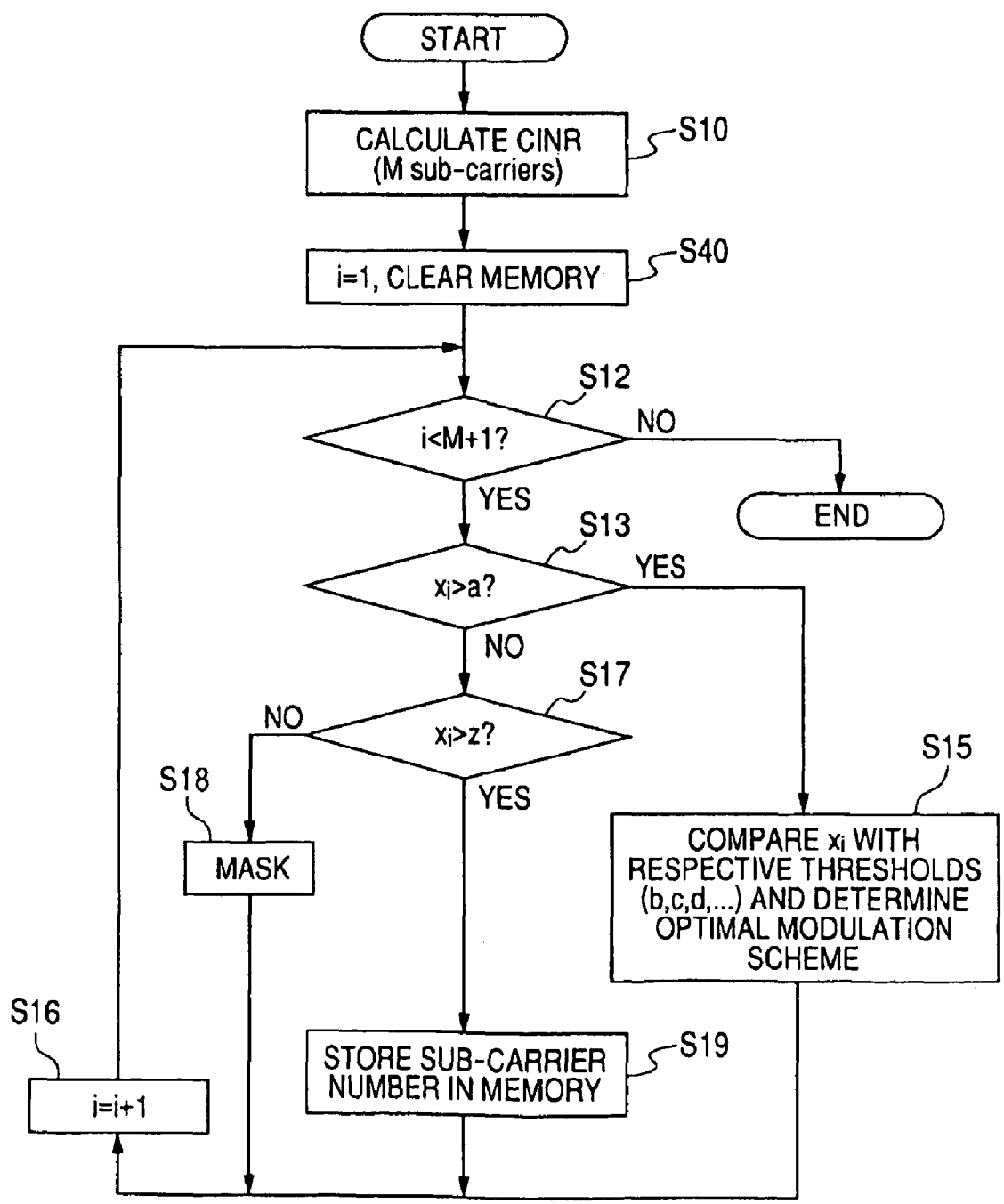
FIG. 20 is a flowchart illustrating storing of a sub-carrier number, as a modified example of operation of a communication apparatus according to the second embodiment.
Figure 21:
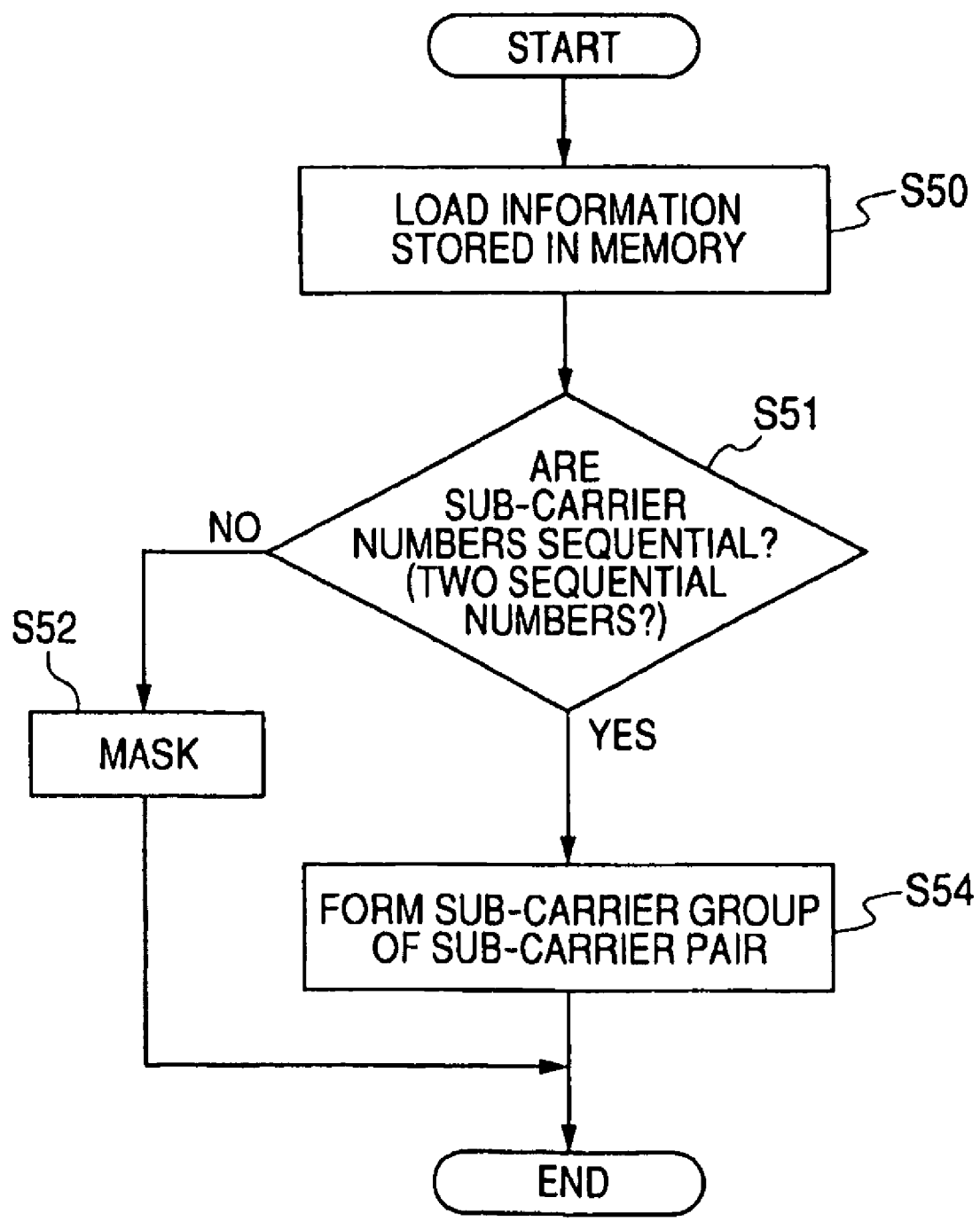
FIG. 21 is a flowchart illustrating forming of a sub-carrier group, as a modified example of the operation of communication apparatus according to the second embodiment.
Figure 22:
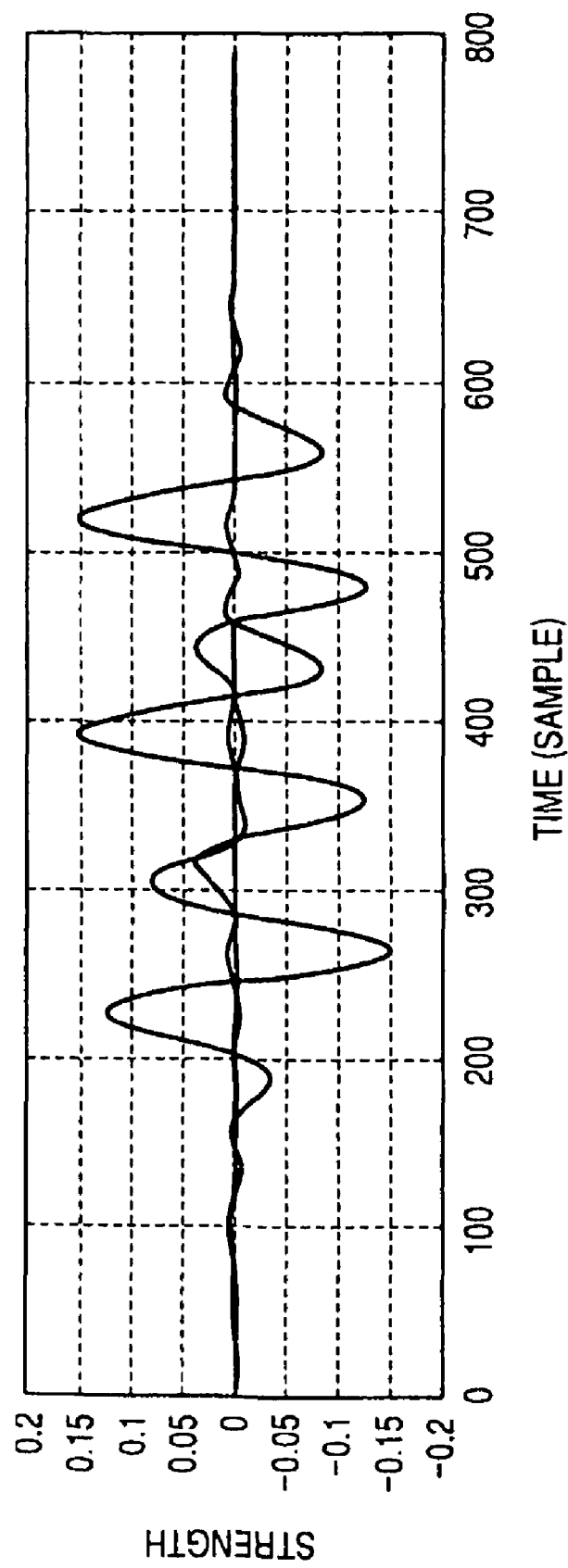
FIG. 22 illustrates an example of wavelet waveforms.
Figure 23:
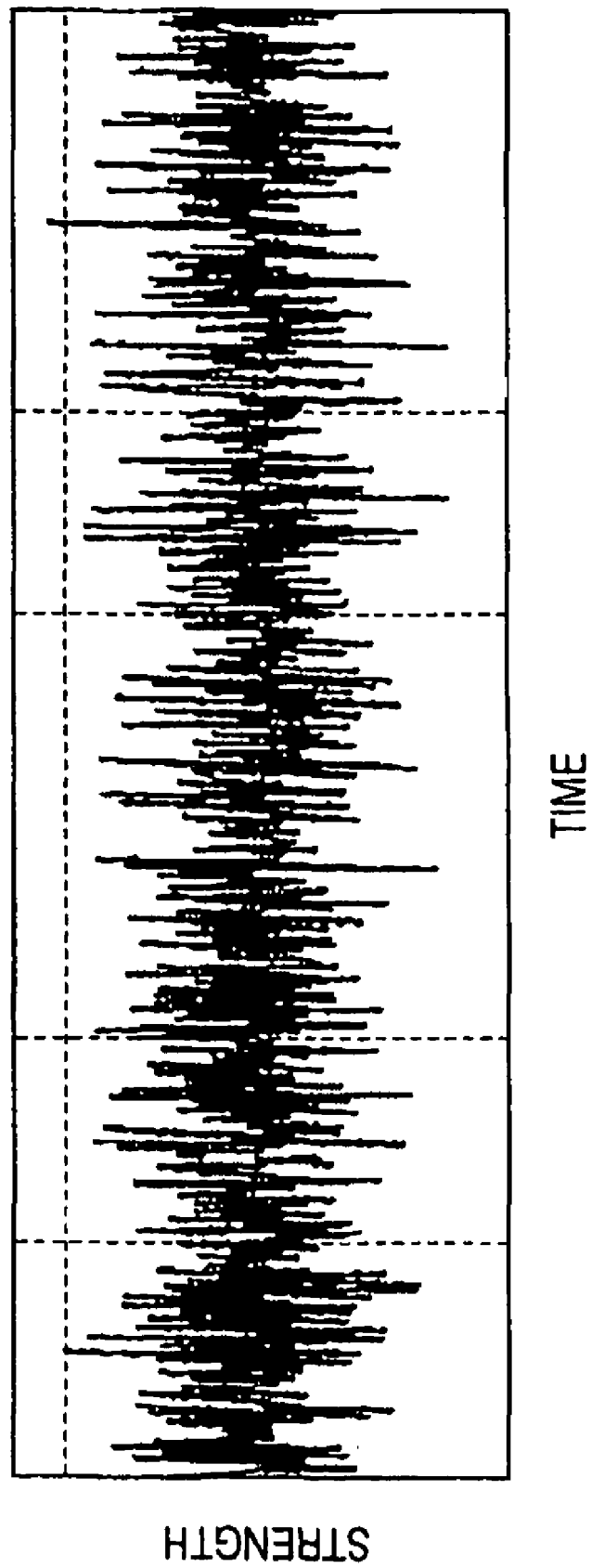
FIG. 23 illustrates an example of a transmitted waveform on a multi-carrier communication apparatus using wavelet-based OFDM.
Figure 24:
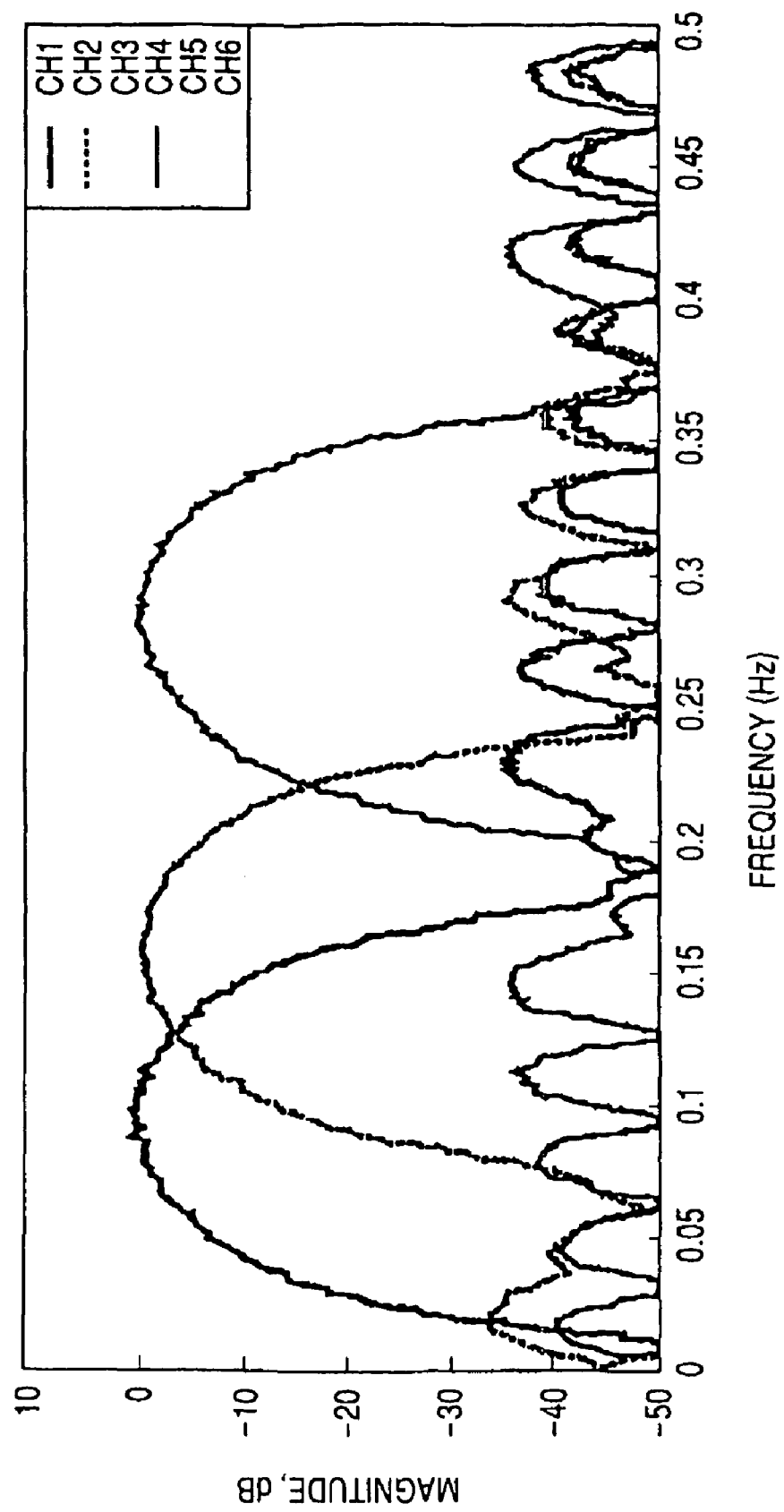
FIG. 24 illustrates an example of a transmitted spectrum on the multi-carrier communication apparatus using the wavelet-based OFDM.
Figure 25:
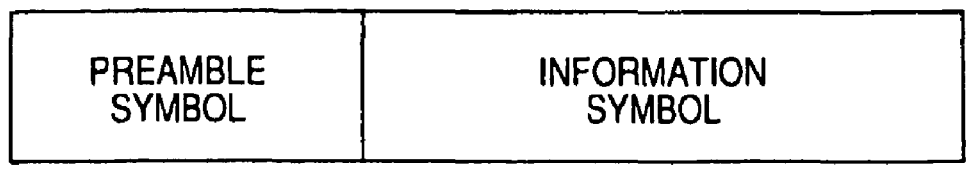
FIG. 25 illustrates an example of a structure within a transmitted frame on the multi-carrier communication apparatus using the wavelet-based OFDM.
Figure 26:
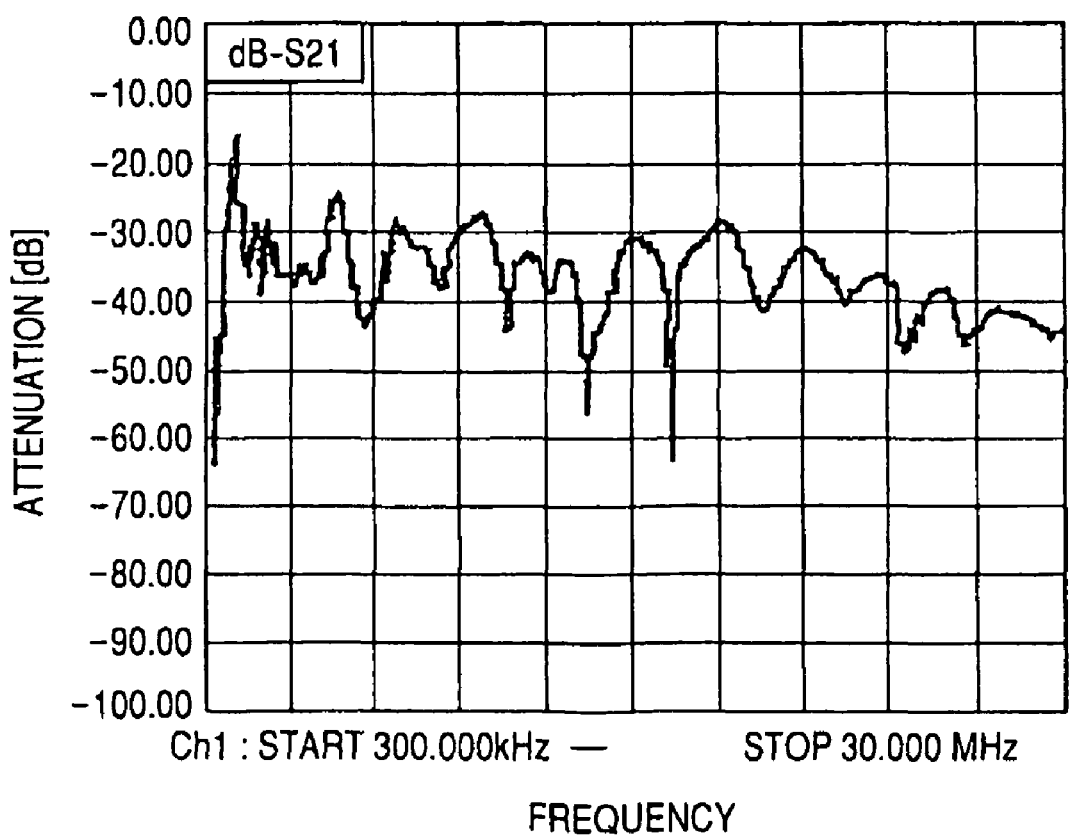
FIG. 26 illustrates attenuation characteristics of a power line transmission line.
Figure 27:
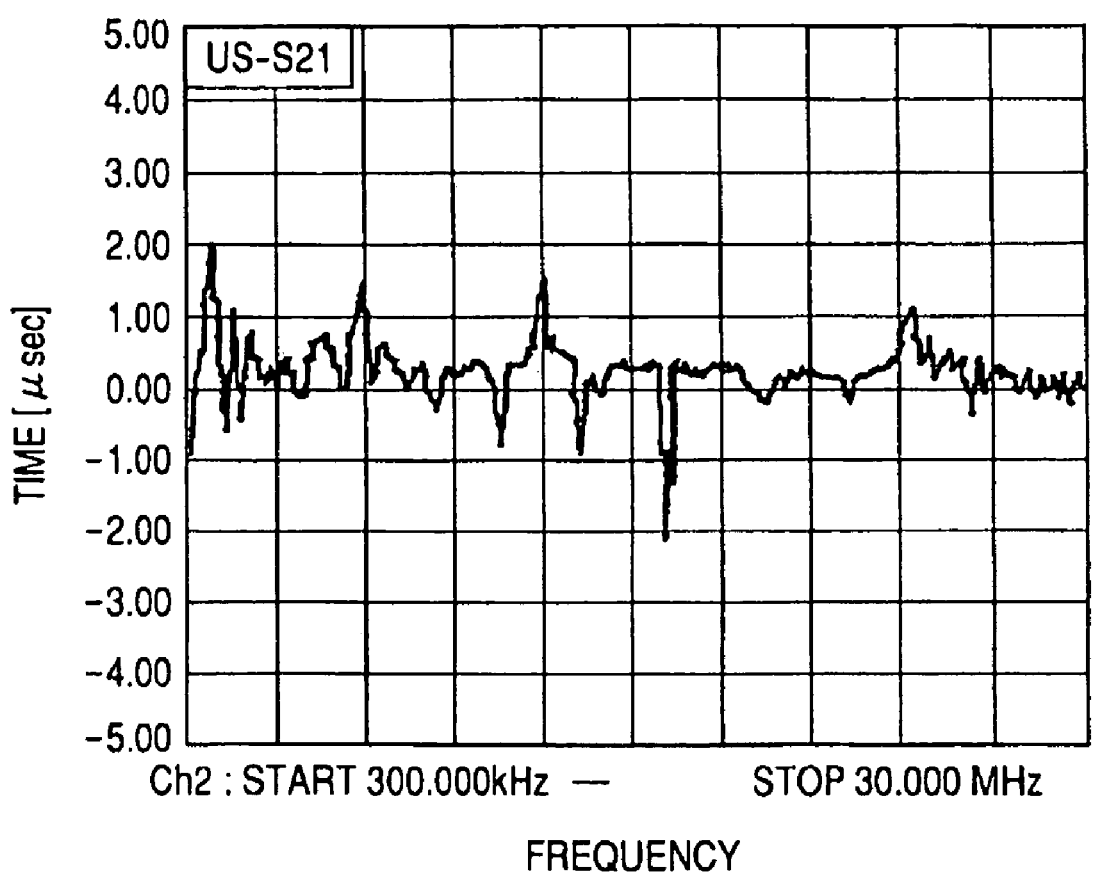
FIG. 27 illustrates group delay characteristics of the power line transmission line.

FIG. 20 is a flowchart illustrating storing of a sub-carrier number, as a modified example of the operation of communication apparatus 10 according to the second embodiment. FIG. 21 is a flowchart illustrating forming of a sub-carrier group, as a modified example of the operation of communication apparatus 10 according to the second embodiment. Although partially overlapping with the above-described operation, the operation of communication apparatus 10 are described below based on FIGS. 20 and 21 so as to provide full description. In FIG. 20, a process same as shown in FIG. 16 is provided with same reference numbers. Steps S20 to S23 in FIG. 16 are eliminated from the flowchart in FIG. 20. That is, the process in FIG. 20 ends when memory 56 stores all sub-carrier numbers having CINRs below the lowest threshold among sub-carriers per one symbol.

Diversity circuit 329C retrieves the sub-carrier numbers stored in memory 56 (step S50) as shown in FIG. 21. Diversity circuit 329C detects sub-carrier numbers adjacent on a frequency domain, and determines whether or not there is at least one pair of adjacent sub-carrier numbers (step S51). When there is no pair of adjacent sub-carrier numbers (step S51: No), channel estimation unit 329 masks the retrieved sub-carrier numbers (step S52). On the other hand, when there is at least one pair of adjacent sub-carriers (step S51: Yes), the adjacent sub-carriers are formed into a sub-carrier group as a sub-carrier pair (step S54).

In the configuration above, selecting the primary modulation scheme of the lowest efficiency for the sub-carrier pair enables the primary modulation scheme having spectral efficiency of 1 bps/Hz even in multi-carrier modulation/demodulation using the wavelet.

INDUSTRIAL APPLICABILITY

The present invention recognizes the transmission status and uses the plurality of sub-carriers, which is normally masked and unused for communication, through diversity. The present invention thereby improves the transfer efficiency and suitably applies to a power line communication system and the like.

The invention claimed is:

1. A communication apparatus performing communication using a multi-carrier signal, the communication apparatus comprising:
    a communication quality calculator that calculates communication quality corresponding to at least two sub-carriers respectively, out of a plurality of sub-carriers included in the multi-carrier signal;
    a sub-carrier detector that compares each of the communication quality calculated by the communication quality calculator with a first threshold, and that detects a plurality of sub-carriers corresponding to lower communication quality than the first threshold, based on the comparison result;
    a sub-carrier extractor that extracts at least two sub-carriers from the plurality of sub-carriers detected by the sub-carrier detector, so that the communication quality exceeds the first threshold; and
    a multi-carrier signal transmitter that assigns same data to the sub-carriers extracted by the sub-carrier extractor, and that transmits the extracted sub-carriers as the multi-carrier signal, wherein:
    the sub-carrier detector further compares the communication quality calculated by the communication quality calculator with a second threshold lower than the first threshold, and detects a sub-carrier corresponding to lower communication quality than the second threshold, based on the comparison result, and
    the sub-carrier extractor extracts the at least two sub-carriers from the plurality of sub-carriers detected by the sub-carrier detector, the plurality of sub-carriers not including the sub-carrier corresponding to lower communication quality than the second threshold, so that the communication quality of the extracted two sub-carriers exceeds the first threshold.

2. The communication apparatus according to claim 1, wherein the first threshold is corresponding to a digital modulation scheme of a lowest multi-level among a plurality of digital modulation schemes of mutually different multi-levels.

3. The communication apparatus according to claim 1, wherein the sub-carrier extractor extracts sub-carriers not adjacent on a frequency domain, as the at least two sub-carriers.

4. The communication apparatus according to claim 1, wherein the sub-carrier detector compares the communication quality calculated by the communication quality calculator with the first threshold in an order from one of low-frequency sub-carriers and high-frequency sub-carriers.

5. The communication apparatus according to claim 1, wherein:
    the sub-carrier extractor extracts from the plurality of sub-carriers detected by the sub-carrier detector, a plurality of sub-carrier groups each of which includes at least two sub-carriers, so that the communication quality exceeds the first threshold; and
    the multi-carrier signal transmitter assigns the same data to the sub-carrier groups separately, and transmits the sub-carrier groups as the multi-carrier signal.

6. The communication apparatus according to claim 5, wherein the sub-carrier extractor extracts the plurality of sub-carrier groups, so that a number of the sub-carriers in the sub-carrier groups is constant.

7. The communication apparatus according to claim 5, wherein:
    the sub-carrier extractor extracts a sub-carrier pair formed of two sub-carriers adjacent on a frequency domain, as the sub-carrier group; and
    the multi-carrier signal transmitter assigns the same data to the sub-carrier pair separately, and transmits the sub-carrier pair as the multi-carrier signal by using a real coefficient wavelet filter bank.

8. The communication apparatus according to claim 7, wherein the sub-carrier extractor extracts the sub-carrier pair, excluding sub-carriers on both ends of the frequency domain.

9. The communication apparatus according to claim 1, wherein the communication quality is indicated by CINR (Carrier to Interference and Noise Ratio).

10. An integrated circuit performing communication using a multi-carrier signal, the integrated circuit comprising:
    a communication quality calculator that calculates communication quality corresponding to at least two sub-carriers respectively, out of a plurality of sub-carriers included in the multi-carrier signal;
    a sub-carrier detector that compares each of the communication quality calculated by the communication quality calculator with a first threshold, and that detects a plurality of sub-carriers corresponding to lower communication quality than the first threshold, based on the comparison result;
    a sub-carrier extractor that extracts at least two sub-carriers from the plurality of sub-carriers detected by the sub-carrier detector, so that the communication quality exceeds the first threshold; and
    a multi-carrier signal transmitter that assigns same data to the sub-carriers extracted by the sub-carrier extractor, and that transmits the extracted sub-carriers as the multi-carrier signal, wherein:
    the sub-carrier detector further compares the communication quality calculated by the communication quality calculator with a second threshold lower than the first threshold, and detects a sub-carrier corresponding to lower communication quality than the second threshold, based on the comparison result; and
    the sub-carrier extractor extracts the at least two sub-carriers from the plurality of sub-carriers detected by the sub-carrier detector, the plurality of sub-carriers not including the sub-carrier corresponding to lower communication quality than the second threshold, so that the communication quality of the extracted two sub-carriers exceeds the first threshold.

11. A communication method using a multi-carrier signal, the communication method comprising:
    calculating communication quality corresponding to at least two sub-carriers respectively, out of a plurality of sub-carriers included in the multi-carrier signal;
    detecting a plurality of sub-carriers corresponding to lower communication quality than a first threshold by comparing each of the calculated communication quality with the first threshold;

detecting a sub-carrier corresponding to lower communication quality than a second threshold, which is lower than the first threshold, by comparing the calculated communication quality with the second threshold;

extracting at least two sub-carriers from the plurality of sub-carriers that do not include the sub-carrier corresponding to lower communication quality than the second threshold, so that the communication quality of the extracted sub-carriers exceeds the first threshold; and assigning same data to the extracted sub-carriers and transmitting the extracted sub-carriers as the multi-carrier signal.

* * * * *